(12) United States Patent
Drieschner

(10) Patent No.: US 8,856,643 B2
(45) Date of Patent: Oct. 7, 2014

(54) UNIQUE URLS FOR BROWSING TAGGED CONTENT

(75) Inventor: Christoph Drieschner, Berlin (DE)

(73) Assignee: Red Hat, Inc., Raleigh, NC (US)

( * ) Notice: Subject to any disclaimer, the term of this patent is extended or adjusted under 35 U.S.C. 154(b) by 1288 days.

(21) Appl. No.: 12/074,121

(22) Filed: Feb. 28, 2008

(65) Prior Publication Data

US 2009/0222720 A1 Sep. 3, 2009

(51) Int. Cl.
*G06F 17/21* (2006.01)
*G06F 17/30* (2006.01)

(52) U.S. Cl.
CPC .............................. *G06F 17/30887* (2013.01)
USPC ....................................................... 715/234

(58) Field of Classification Search
USPC ....................................................... 715/206
See application file for complete search history.

(56) References Cited

U.S. PATENT DOCUMENTS

| | | | |
|---|---|---|---|
| 7,756,945 B1 * | 7/2010 | Andreessen et al. | 709/217 |
| 7,945,600 B1 | 5/2011 | Thomas et al. | |
| 8,468,447 B2 | 6/2013 | Drieschner | |
| 8,606,807 B2 | 12/2013 | Drieschner | |
| 8,607,136 B2 | 12/2013 | Drieschner | |
| 2001/0029527 A1 | 10/2001 | Goshen | |
| 2005/0234891 A1 * | 10/2005 | Walther et al. | 707/3 |
| 2005/0283737 A1 | 12/2005 | Ha | |
| 2006/0036966 A1 * | 2/2006 | Yevdayev | 715/779 |
| 2006/0242178 A1 * | 10/2006 | Butterfield et al. | 707/100 |
| 2006/0242574 A1 * | 10/2006 | Richardson et al. | 715/530 |
| 2007/0078832 A1 * | 4/2007 | Ott et al. | 707/3 |
| 2007/0088832 A1 | 4/2007 | Tsang et al. | |
| 2007/0124208 A1 * | 5/2007 | Schachter et al. | 705/14 |
| 2007/0174247 A1 * | 7/2007 | Xu et al. | 707/3 |
| 2007/0266384 A1 | 11/2007 | Labrou et al. | |
| 2007/0271498 A1 * | 11/2007 | Schachter | 715/501.1 |
| 2008/0034279 A1 * | 2/2008 | Kumar et al. | 715/206 |
| 2008/0040674 A1 * | 2/2008 | Gupta | 715/745 |
| 2008/0082486 A1 * | 4/2008 | Lermant et al. | 707/3 |
| 2008/0086471 A1 * | 4/2008 | Ritter et al. | 707/8 |
| 2008/0086496 A1 * | 4/2008 | Kumar et al. | 707/102 |
| 2008/0091797 A1 | 4/2008 | Busey | |
| 2008/0109881 A1 * | 5/2008 | Dasdan | 726/4 |
| 2008/0114573 A1 * | 5/2008 | Hsieh et al. | 703/2 |
| 2008/0154949 A1 * | 6/2008 | Brooks et al. | 707/103 R |

(Continued)

OTHER PUBLICATIONS

Golder et al., Usage Patterns of Collaborative Tagging Systems, Journal of Information Science, vol. 32, 2006, p. 198-208.*

(Continued)

*Primary Examiner* — Frank D Mills
(74) *Attorney, Agent, or Firm* — Lowenstein Sandler LLP

(57) ABSTRACT

Techniques for tagging document pages via unique URLs are described herein. According to one embodiment, tags used to tag document pages and associated with one or more communities are stored in a storage. Each document page is identified via a unique URL. Each tag is associated with URLs of the document pages and each tag is associated with one or more communities. During browsing a particular document page in a main window of a browser, a URL of the browsed page is displayed in a sidebar window communicatively coupled to the main window. A tag input field is displayed in the sidebar window to receive a tag to be associated with the displayed URL, such that the tagged particular document page can be retrieved subsequently via the associated URL based on the tag. Other methods and apparatuses are also described.

19 Claims, 21 Drawing Sheets

(56) References Cited

U.S. PATENT DOCUMENTS

| | | | |
|---|---|---|---|
| 2008/0172399 A1* | 7/2008 | Chi et al. | 707/100 |
| 2008/0276177 A1* | 11/2008 | Sauve | 715/733 |
| 2008/0288640 A1* | 11/2008 | Trevor et al. | 709/226 |
| 2009/0006442 A1* | 1/2009 | Anderson et al. | 707/102 |
| 2009/0006556 A1* | 1/2009 | Agarwal et al. | 709/206 |
| 2009/0043624 A1 | 2/2009 | Fioca et al. | |
| 2009/0094189 A1* | 4/2009 | Stephens | 707/2 |
| 2009/0144240 A1* | 6/2009 | Singh et al. | 707/3 |
| 2009/0171884 A1 | 7/2009 | Wright | |
| 2009/0171898 A1 | 7/2009 | Prager et al. | |
| 2009/0222738 A1 | 9/2009 | Drieschner | |
| 2009/0222755 A1 | 9/2009 | Drieschner | |
| 2009/0222759 A1 | 9/2009 | Drieschner | |
| 2010/0232656 A1* | 9/2010 | Ryu | 382/118 |

OTHER PUBLICATIONS

Yanbe, Yusuke, Adam Jatowt, Satoshi Nakamura, and Katsumi Tanaka. "Can social bookmarking enhance search in the web?." In Proceedings of the 7th ACM/IEEE-CS joint conference on Digital libraries, pp. 107-116. ACM, 2007.*
Office Action mailed Jun. 23, 2010, for U.S. Appl. No. 12/074,044.
Office Action mailed Nov. 12, 2010, for U.S. Appl. No. 12/074,044.
Office Action mailed Mar. 10, 2011, for U.S. Appl. No. 12/074,046.
Advisory Action mailed Jan. 20, 2011, for U.S. Appl. No. 12/074,044.
Office Action mailed Aug. 16, 2011, for U.S. Appl. No. 12/074,046.
Office Action mailed Apr. 12, 2011, for U.S. Appl. No. 12/074,049.
Office Action mailed Oct. 25, 3011, for U.S. Appl. No. 12/074,049.
Office Action mailed Jan. 18, 2012, for U.S. Appl. No. 12/074,046.
Notice of Allowance mailed Feb. 20, 2013, for U.S. Appl. No. 12/074,046.
Office Action mailed Aug. 23, 2012, for U.S. Appl. No. 12/074,044.
Office Action mailed Jan. 31, 2013, for U.S. Appl. No. 12/074,044.
USPTO; Office Action mailed May 1, 2013, for U.S. Appl. No. 12/074,049.
USPTO, Notice of Allowance mailed Aug. 13, 2013, for U.S. Appl. No. 12/074,049.
USPTO, Notice of Allowance mailed Aug. 2, 2013, for U.S. Appl. No. 12/074,044.

* cited by examiner

UNIQUE URLS FOR BROWSING TAGGED CONTENT

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to managing tagged document pages. More particularly, this invention relates to tagging document pages via unique URLs.

BACKGROUND

Web browsers are programs that serve as a front end to the World Wide Web on the Internet. In order to view a Web site, its address, i.e. Uniform Resource Locator (URL), is typed into the Web browser's location field and the home page of that Web site is downloaded to the Web browser. The home page is an index to other Web pages on that site that can be accessed by clicking a message or an icon on the home page. The home page is either received in a Hypertext Markup Language (HTML) format or is converted to an HTML format by the Web browser for displaying to the user.

Using a browser, a user may visit a large number of web sites in various browser sessions. At each web site, a user may also visit multiple web pages during an individual browser session. In some cases, a description and an address (e.g., the Uniform Resource Locator or URL) for a web page visited during a browser session may be saved in a sequential, stack-based "history" list, possibly allowing a user to return to a previously visited web page by selecting its description from the history list. A user can open the history list to select previously viewed resources, which are usually identified by the title or address of the web page. A user can also "bookmark" a currently viewed web page in a favorites list to facilitate selection of the bookmarked resource from the Favorites list for a later visit.

Certain resources may be tagged or managed based on certain criteria. However, there has been lack of user friendly environment to manage certain resources such as bookmarked Web pages or resources.

BRIEF DESCRIPTION OF THE DRAWINGS

The present invention is illustrated by way of example and not limitation in the figures of the accompanying drawings in which like references indicate similar elements.

FIGS. 2A-2K are screenshots illustrating examples of graphical user interfaces (GUIs) of a tag browsing framework according to certain embodiments of the invention.

FIGS. 4A-4C are screenshots illustrating an example of GUI of a sidebar application according to one embodiment of the invention.

FIGS. 6A-6C are screenshots illustrating an example of GUIs of configuring a sidebar framework according to one embodiment of the invention.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
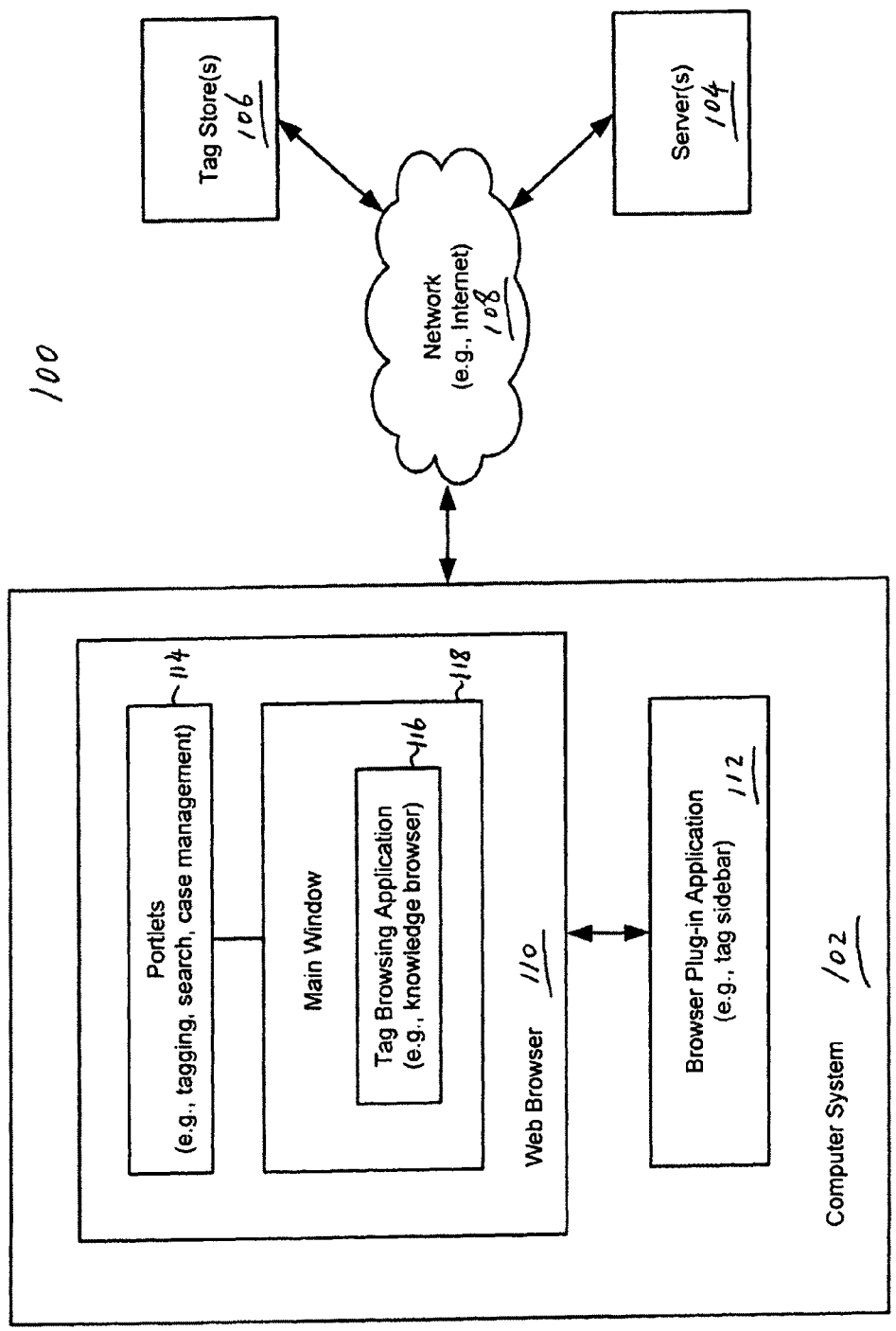
FIG. 1 is a block diagram illustrating an example of a network system according to one embodiment of the invention.

FIG. 1 is a block diagram illustrating an example of a network system according to one embodiment of the invention. Referring to FIG. 1, system 100 includes a computer system 102 communicatively coupled to remote systems 104-106 over a network 108. System 102 may be a client or a server system and systems 104-106 may be server systems such as a Web server or a network-based data storage system. Network 108 may be a wide area network (WAN) such as Internet, a local area network, or a combination of both. For purposes of illustration, throughout this application, systems 104-106 are described as Web servers and system 102 is described as a client system. Similarly, network 108 is described as the Internet. However, it will be appreciated that other configurations may exist.

Referring back to FIG. 1, system 102 includes a browser application 110 (e.g., Web browser) such as Internet Explorer™ available from Microsoft Corporation of Redmond, Wash. or Firefox™ available from Mozilla of Mountain View, Calif. System 102 further includes a browser plug-in application 112 (also referred to as a browser companion framework) communicatively coupled to the browser application 110. In one embodiment, browser plug-in application 112 is able to access content displayed in a main window 118 of browser 110 in which a tag browsing application 116 may display certain tagged items or resources in the main window 118. For example, the plug-in application 112 may display or pop up a tag sidebar communicatively coupled to the main window 118. Within the tag sidebar, one or more portlets (e.g., portal pages) may be displayed for a variety of purposes, such as, for example, tagging, search request, and/or case management purposes.

In one embodiment, an extension associated with browser application 110 sets up the necessary security settings such that a web application (e.g., a plug-in application such as browser plug-in application 112) calling in the browser sidebar can access information from the main window 110, such as, for example, a URL or universal resource locator. For example, the plug-in application 112 may install a button or control that calls a portal page (e.g., portlets 114) to be loaded in the browser sidebar (not shown). The portal can serve any kind of portlets that acts as "browsing companions", such as, for example, a search request portlet and a case management portlet which profit from being available at the same time as a user works on several other tabs in the main window 118.

In one embodiment, the framework 112 may further include a "watchdog" (not shown) that watches the URL of the main page in an optimized way. For example, the watchdog is aware of a currently active tab, it is almost in real time without firing too much (e.g. when a user scrolls through his/her tabs) requests or calls. That is useful because the sidebar might fire a new request for the sidebar page on every change of the main window URL. Generally, the sidebar does not do a full page refresh on a change to the main window URL, rather the contained Java script objects get informed, and the Java script objects fire small AJAX (Asynchronous Java Script and XML) requests to update their content.

AJAX applications are mainly executed on the user's machine, by manipulating the current Web page within their browser using document object model (DOM) methods. AJAX can be used for a multitude of tasks such as updating or deleting records; expanding Web forms; returning simple search queries; or editing category trees—all without the requirement to fetch a full page of HTML each time a change is made. Generally, only small requests need to be sent to the server, and relatively short responses are sent back. This permits the development of more interactive applications featuring more responsive user interfaces due to the user of DHTML (Dynamic HTML) techniques.

The scripting application or applications running at the server may be developed using frameworks and technologies based on several popular platforms, including Macromedia Flash, Sun Java, Microsoft ASP. NET, DHTML (Dynamic HTML), JavaScript, HTML, Extensible Markup Language (XML), cascading style sheets (CSS), the Document Object Model (DOM), and the Microsoft XMLHTTPRequest object, etc.

Referring back to FIG. 1, a tagging sidebar portlet is a portal page sitting in the browser sidebar and showing all tags that are given to the page viewed in the main browser window 118. In one embodiment, there is an input field for new tags, and a checklist of communities, to which a user may want to assign newly given tags. Checking a checkbox such as "show tag details" may reveal date, author and communities of given tags. Details can be edited (e.g. tags can be removed from certain communities). An AJAX mechanism may be used to suggest existing tags when entering a tag, ordering the suggestion by popularity, thus contributing to a consolidated tag base.

In one embodiment, a tag browsing application 116 (e.g., a knowledge browser) includes three main areas: a resource list, a communities box, and a tag box on startup, where the resource list shows all tagged resources in any community. A tag box shows a list of all available tags in a particular community or communities. The communities box shows one or more checkboxes for the available communities (all checked by default), and a special "only my tags" checkbox (by default unchecked). If a user unselects some of the communities, the list of resources changes to show only the tags associated with the checked communities. If the user checks the "only my tags" checkbox, only the tags associated with the user are shown.

In one embodiment, the tag box shows a list of all available tags (in the checked communities). If a user selects a tag, the list of resources is updated in real time to show only the resources that are tagged with this tag in the checked community. In addition, according to one embodiment, there is another section such as "related" tags in the tag box, which shows any other tags that are available on any resource already filtered by the first tag (in the checked communities). If a user clicks on one of the related tags, the resource list only shows resources that have both of the tags, and the list of related tags is updated correspondingly. This allows for a fast drill down on the existing tagged resources by their aspects.

Referring back to FIG. 1, tag stores 106 may be implemented as a server or a data storage system to store the resources such as URLs of certain Web pages or documents tagged by one or more users of one or more communities, when those users browse or access certain Web sites such as Web servers 104 over the Internet 108. In one embodiment, the tag store backend 108 is implemented as a triple store, so every tag can have a tag type. This makes it easy to export the tag space into a RDF (resource description framework) format for further processing, data mining, or extension of functionality. Power users can enter tags in the form Tagtype:tag (e.g. Format:Tutorial).

Note that each tagged document or Web page may be stored in tag store 106 and associated with a URL, such that a tagged page or document may be accessed via the URL by any user that browses using the framework. For example, a first user may browse and find a particular tagged page and email the associated URL to a second user. The second user may then "pick up" the URL to access the tagged page. Thus, each tagged page seems to be stored in a persistent storage and identified by a corresponding URL. Such a tagged page can accessed via the associated URL at any time by any user.

To not confuse standard users, by default tags are interpreted as being of type "keyword", and the tag type is not shown. If a tag with a different type is chosen from autosuggest, the newly given tag will use the chosen tags type. Even though much of the tag type functionality is hidden from the user, it also allows for neat tricks like entering "Format:" into the tagging sidebar input field, and autosuggest will come up with the available tags of this type: Reference, Tutorial, Article, etc. The same works for "Product:" and "Publishlevel:" and any other tag type that the user chooses to create. Note that some or all of the components as shown in FIG. 1 may be implemented in software, hardware, or a combination of both. Other configurations may also exist.

FIGS. 2A-2K are screenshots illustrating examples of graphical user interfaces (GUIs) of a tag browsing framework according to certain embodiments of the invention. For example, GUIs as shown in FIGS. 2A-2M may be implemented as part of a browser companion framework communicating with a Web browser as described above with respect to FIG. 1.

Figure 2A:
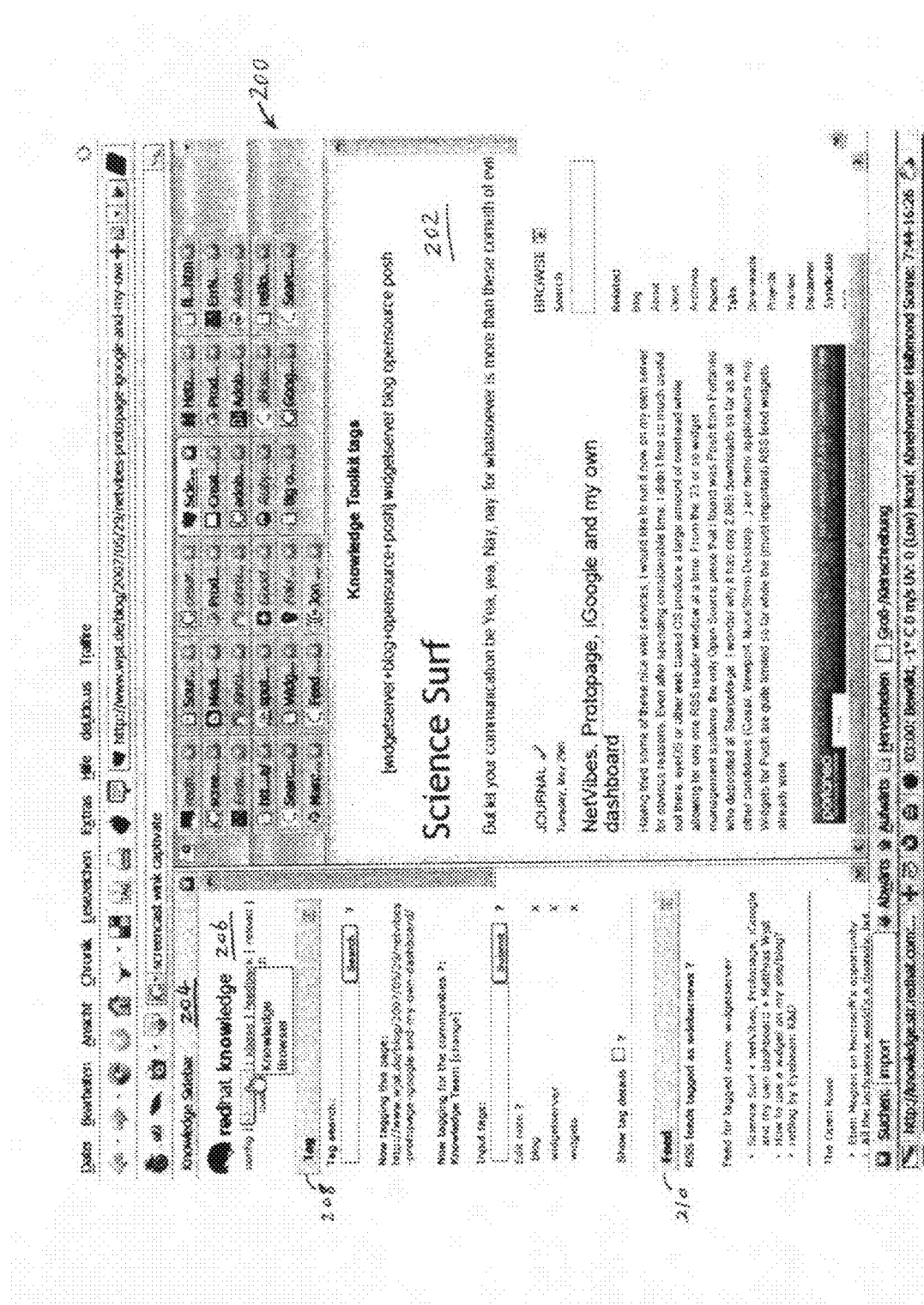

Referring to FIG. 2A, according to one embodiment, GUI 200 includes a main browsing window 202 and a sidebar window 204, which may be a plug-in application to the browser 200. In one embodiment, browser 200 may include a specific plug-in interface having certain security measure to allow sidebar 204 to access the content displayed in the main window 202. In addition, sidebar 204 includes one or more buttons or links 206, which when activated, additional information such as windows or pages may be displayed. According to one embodiment, sidebar 204 further includes a tag area 208 having a variety of fields such as search and input fields to allow a user to search certain tags or enter a new tag, which will be described in details further below.

According to another embodiment, sidebar 204 further includes a feed area 210 to allow a user to subscribe information feed with respect to updates or changes associated with a particular tag, where the information is actively fed, for example, via an RSS (sometimes also referred to as really simple syndication, RDF site summary, or rich site summary) feed mechanism, to the user.

RSS is a family of Web feed formats used to publish frequently updated content such as blog entries, news headlines or podcasts. An RSS document, which called a "feed," "Web feed," or "channel," contains either a summary of content from an associated Web site or the full text. RSS makes it possible for people to keep up with their favorite Web sites in an automated manner that is easier than checking them manually. RSS content can be read using software called an "RSS reader," "feed reader" or an "aggregator." The user subscribes to a feed by entering the feed's link into the reader or by clicking an RSS icon in a browser that initiates the subscription process. The reader checks the user's subscribed feeds regularly for new content, downloading any updates that it finds.

Figure 2B:
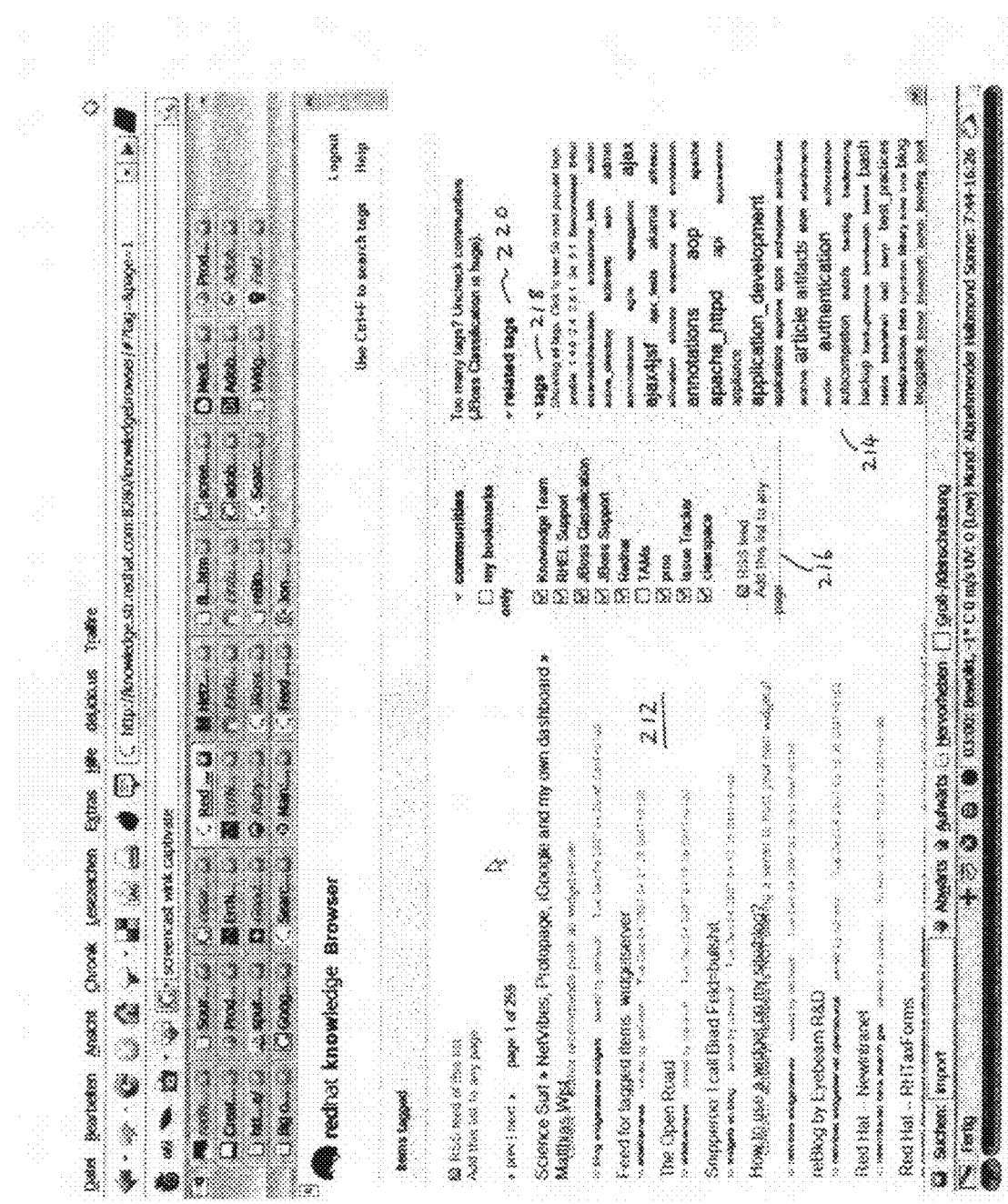

Referring back to FIG. 2A, from sidebar 204, a tag browser page may be activated via a corresponding link (e.g., "Knowledge Browser") from menu bar 206, as shown in FIG. 2B. Referring to FIG. 2B, the tag browser page includes, but not limited to, a resource display area 212, a tag display area 214, and a community display area 216. Resource display area 212 is used to display a list of resources, such as links having corresponding URLs, which include one or more tags displayed in tag display area 214, which may be implemented as a portlet and associated with one or more communities selected in the community display area 216, which may also be implemented as a portlet.

In one embodiment, tag display area 214 includes a tag area 218 having all tags in which at least one of them is associated with at least one resource displayed in resource display area 212. The tag display area 214 further includes a related tag area 220 having one or more tags that may be related to one or more tags displayed in tag area 218. Any of the tags displayed in area 214 may be selected or unselected by a user which in turn causes certain resources displayed or removed from resource display area 212. Similarly, any of the communities displayed in community area 216 may also be selected and unselected which also in turn causes certain resources to be displayed or removed from display area 212. Note that the resources displayed in resource area 212 only include those having one or more tags displayed in area 214 and associated with one or more selected communities displayed in area 216. Thus, by changing the selections in areas 214 and 216, corresponding resources displayed in area 212 will be displayed and changed dynamically.

Figure 2C:
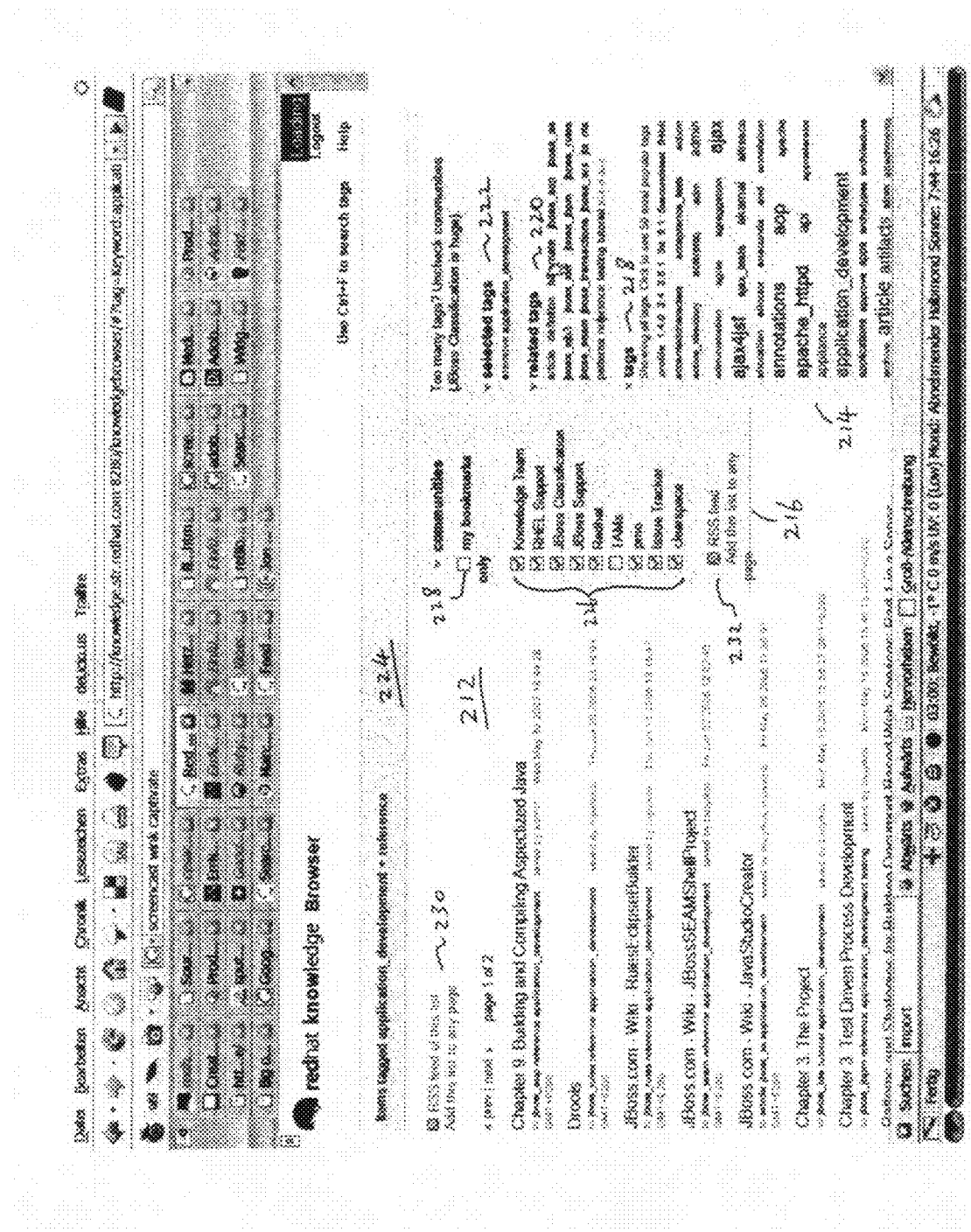

For example, as shown in FIG. 2C, when a user selects one or more tags from tag display area 214, resources (e.g., tagged pages) displayed in resource display area 212 will change. In this example, the user selects tag "application_development," which is shown in display area 222 indicated what tags have been selected. As a result, the resource display area 212 will dynamically display only the resources containing or associated with the selected tag of "application_development." Without selecting tag of "application_development," the resource display area 212 displays all resources that contain or are associated with one or more tags display in tag area 218. By selecting a tag, the resources displayed in area 212 will be filtered based on the selected tag.

Figure 2D:
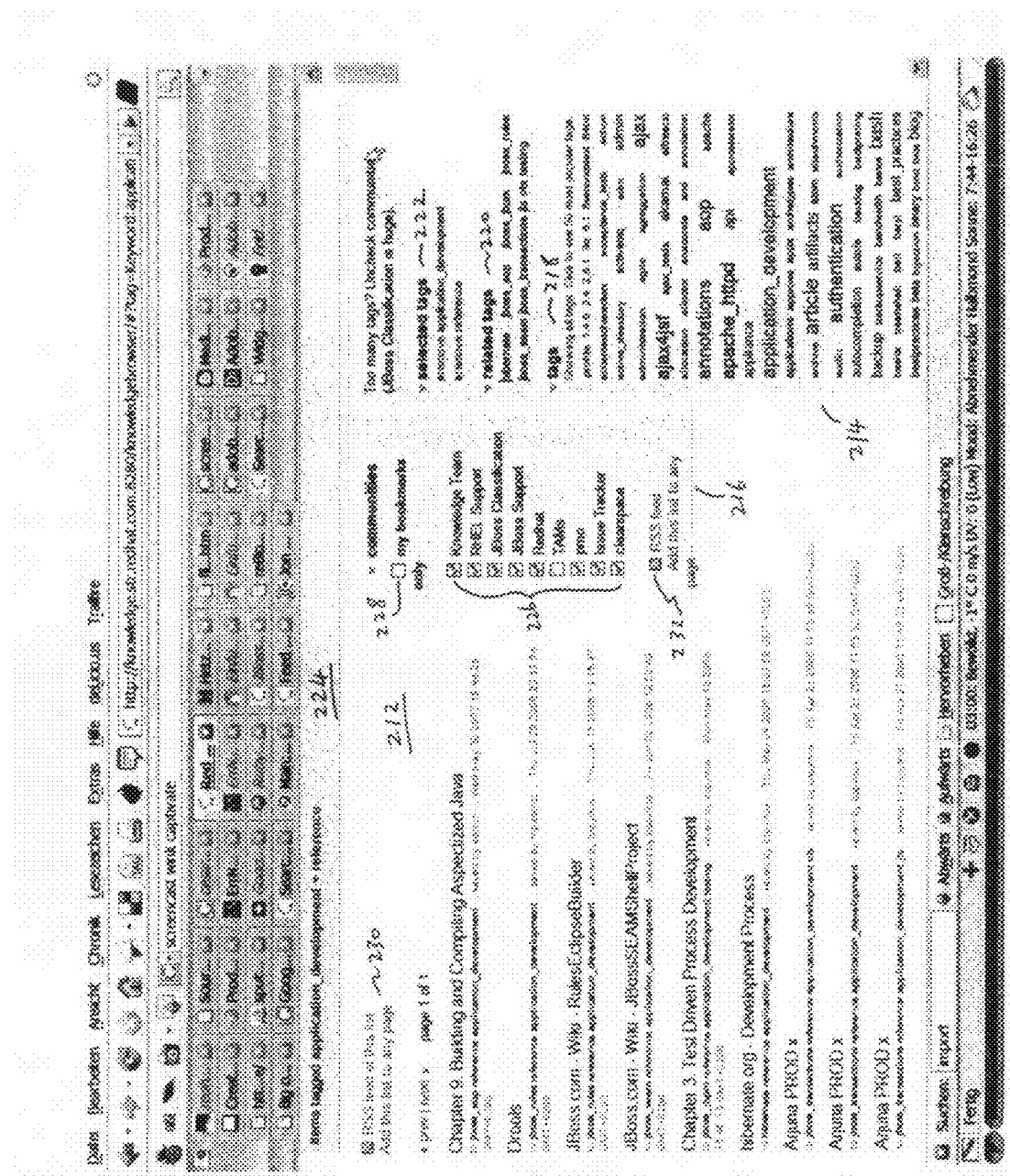

In addition, one or more related tags may be displayed in the related tag area 220. In this example, the related tags include a related tag "reference", which will further filter the resources displayed in resource display area 212. Now, by selecting tags "application_development" and "reference", which are shown in display area 224, the tagged resources are further filtered down and displayed in resource display area 212, as shown in FIG. 2D. Similarly, as shown in FIG. 2D, any of the selected tags displayed in area 222 may be removed or unselected, for example, by clicking button or control "remove" and the corresponding resource list displayed in resource display area 212 will be updated accordingly.

Figure 2E:
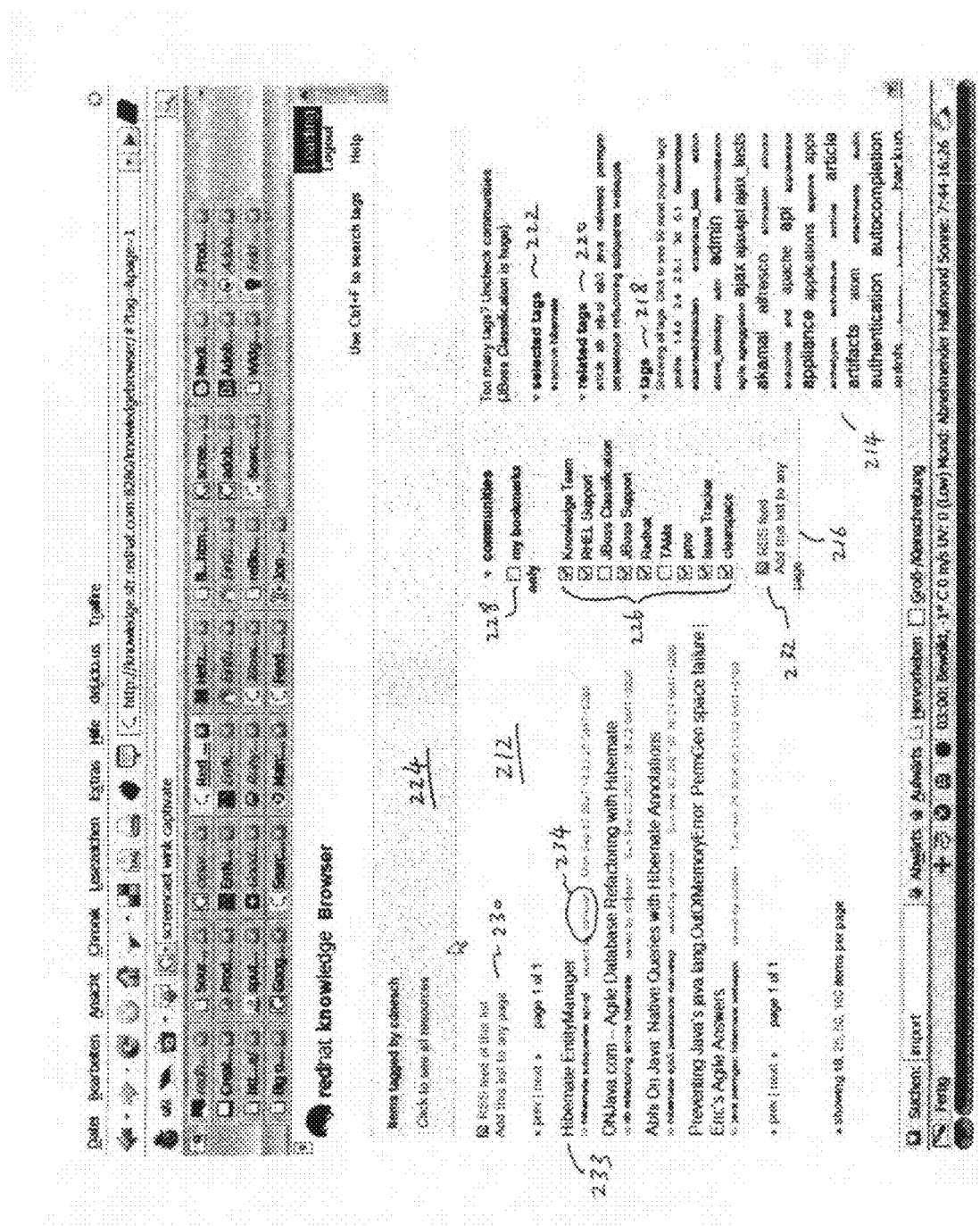
Figure 2F:
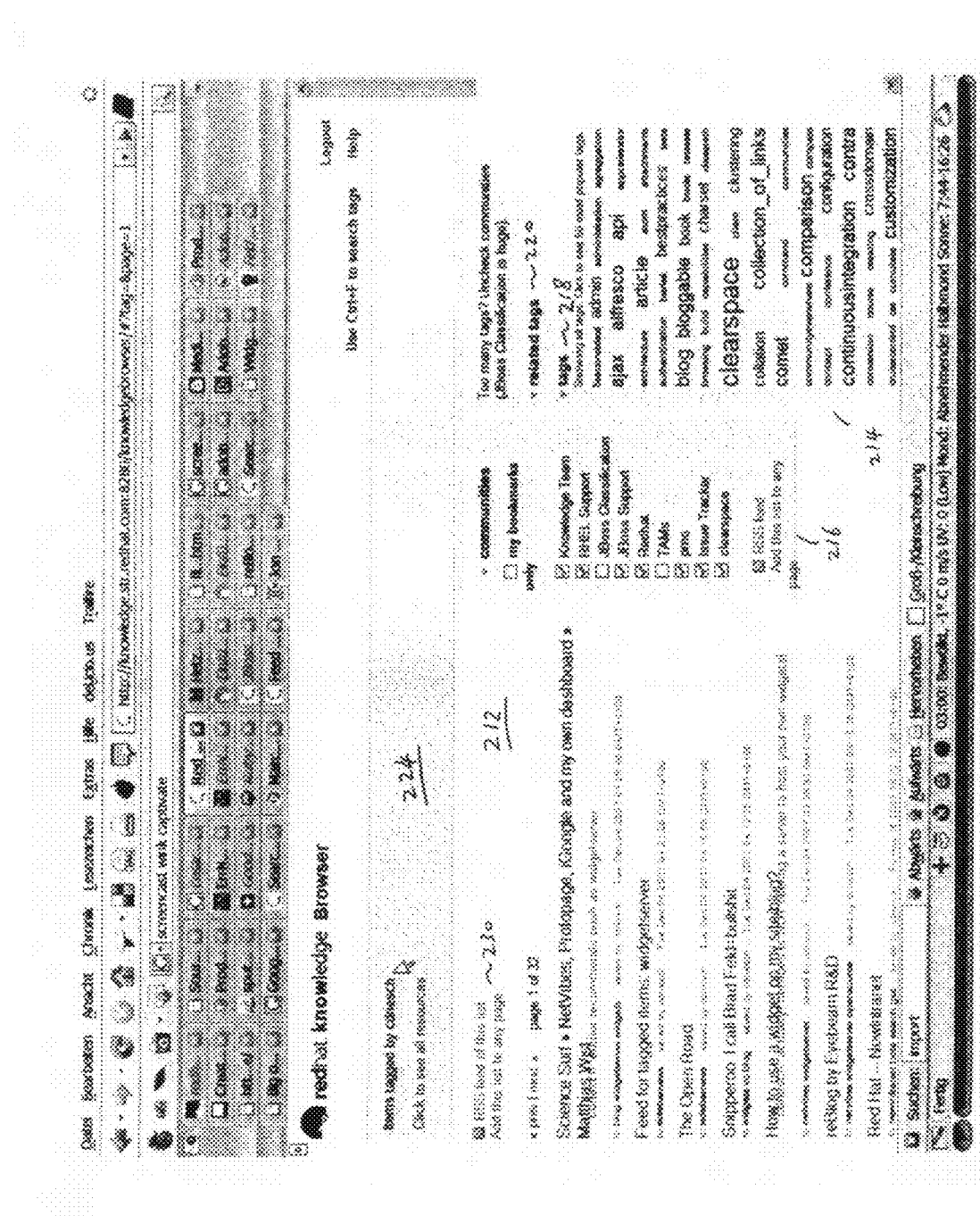
Figure 2G:
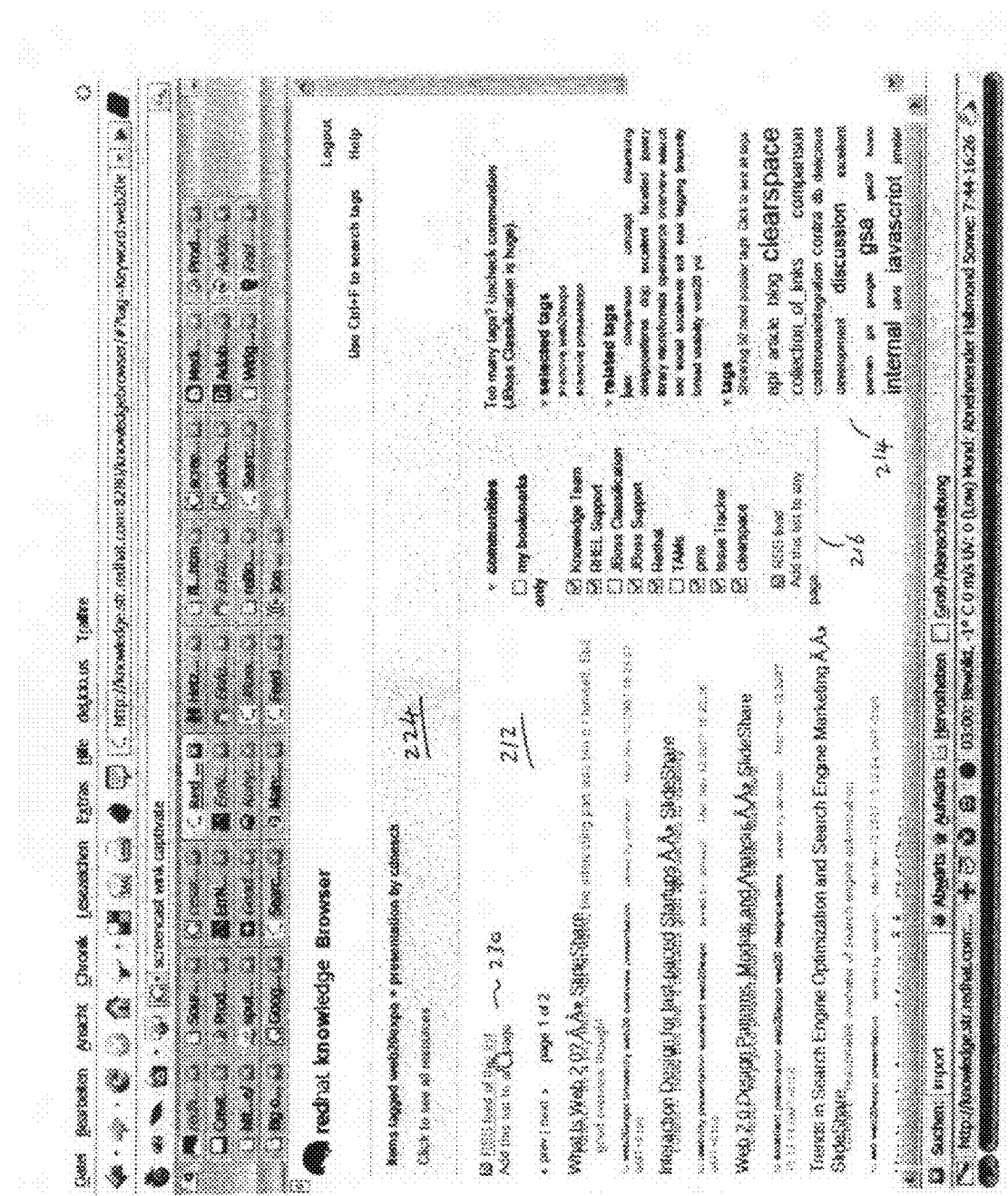
Figure 2H:
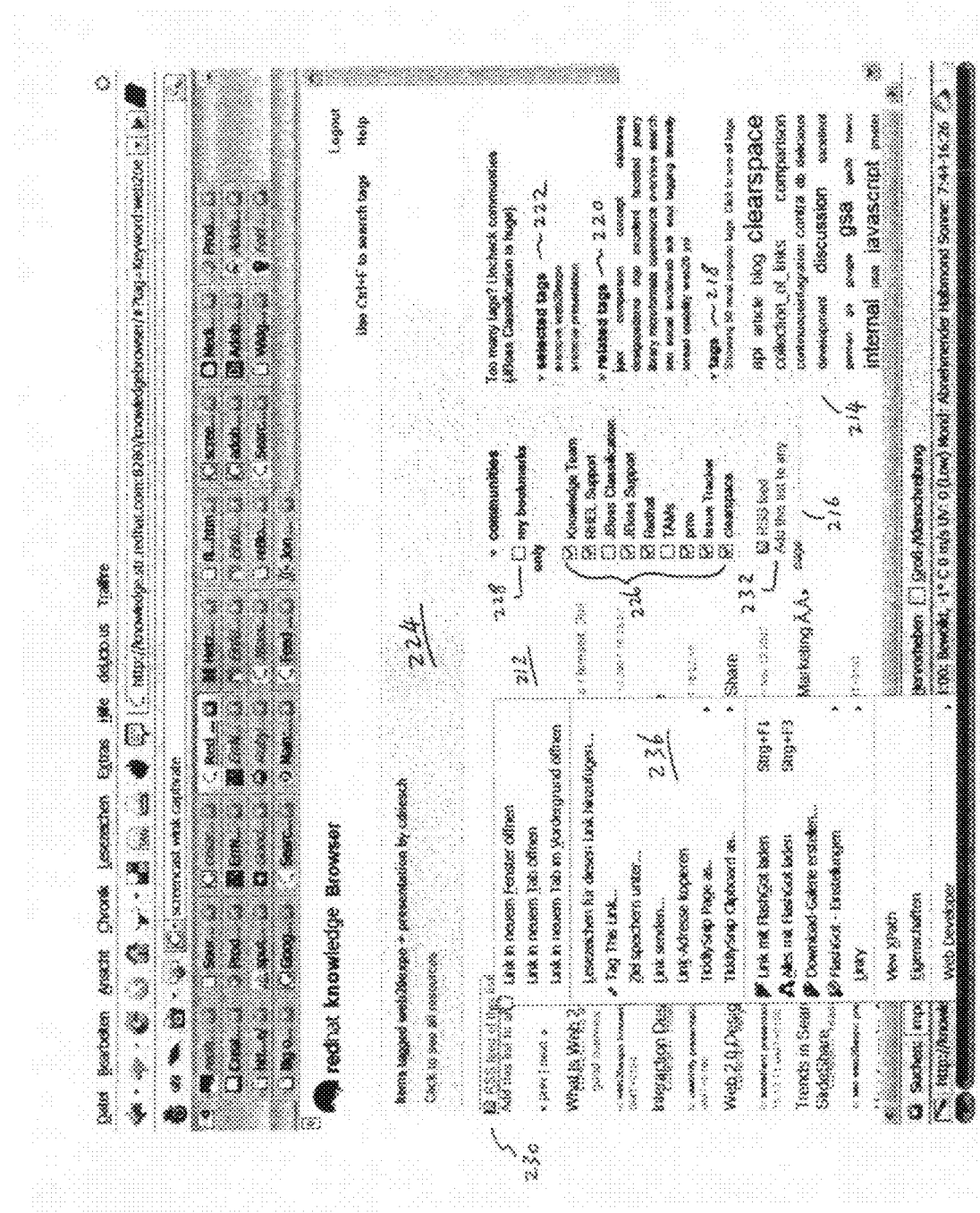
Figure 21:
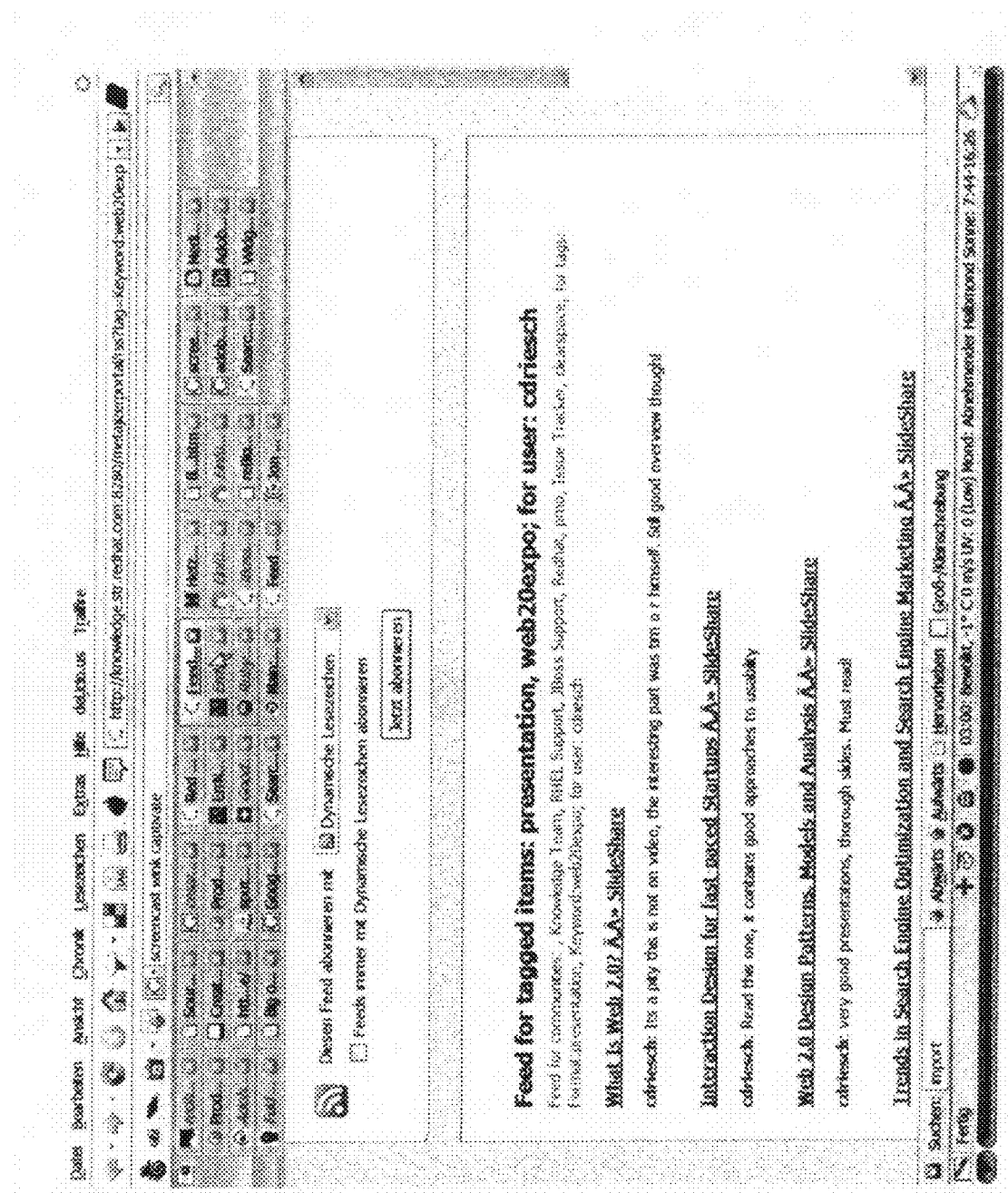
Figure 2J:
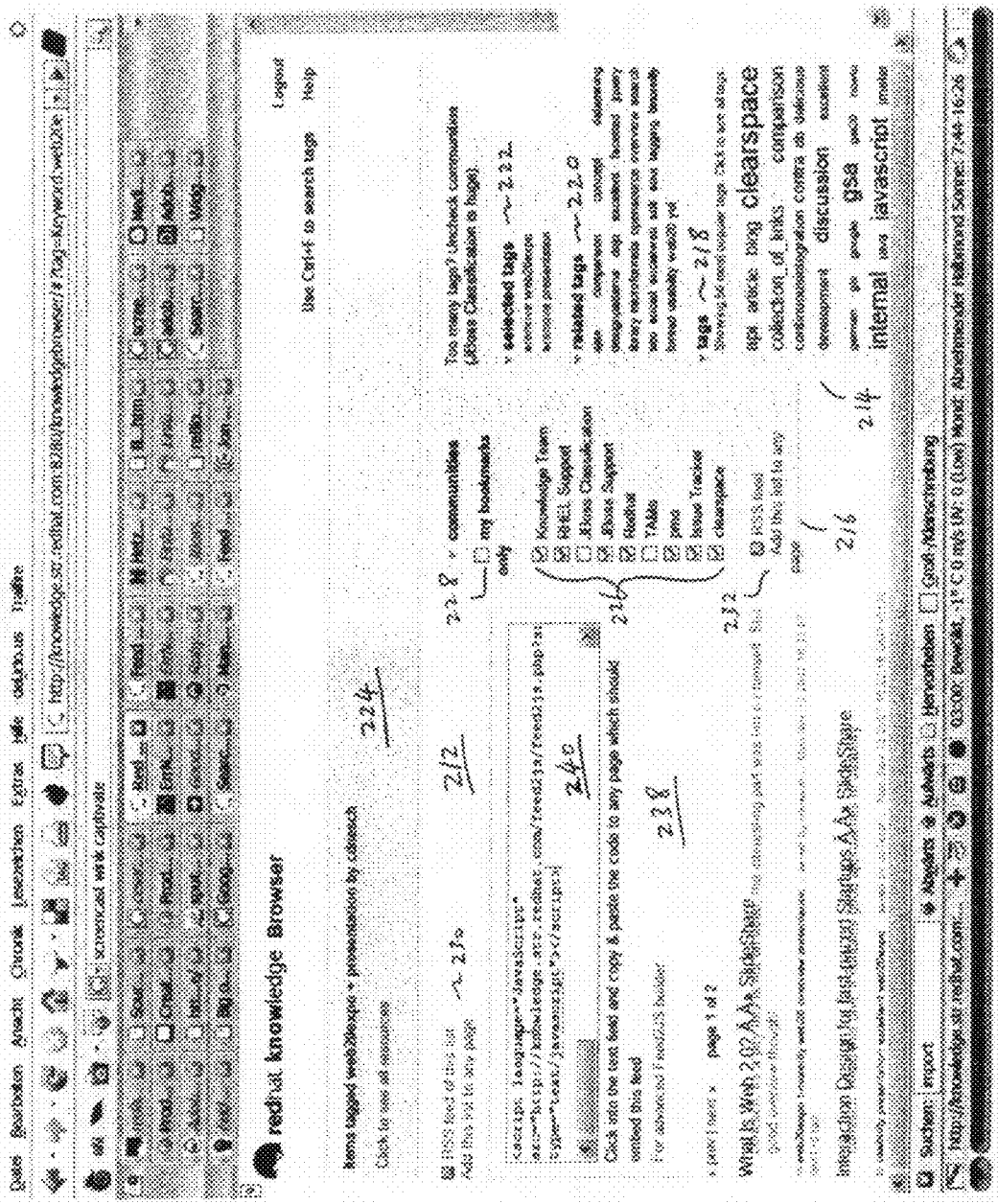
Figure 2K:
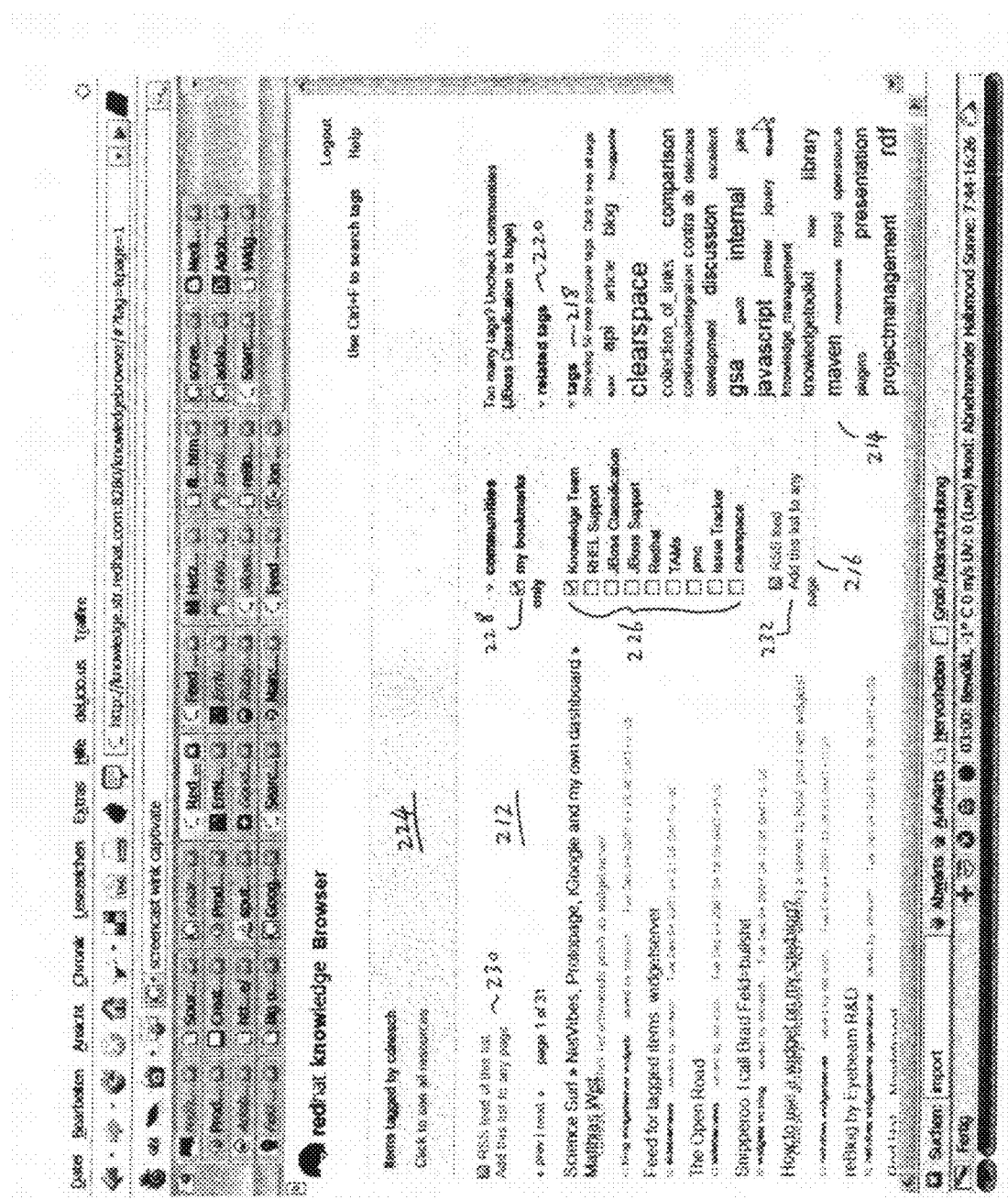

Furthermore, according to one embodiment, resources displayed in resource display area 212 may be further filtered by selecting and/or unselected one or more communities displayed in community area 216. For example, any of the communities 226 displayed in area 216 may be selected or unselected. Any selection or unselection of any community may causes the resources displayed in resource display area 212 to change. In addition, according to one embodiment, a user may select "my bookmarks only" 228 to shown those resources that are tagged or associated with the user itself, for example, as shown in FIG. 2K.

According to a further embodiment, referring to FIG. 2D, a user may subscribe any update from any of the resources listed in resource display area 212 by clicking, activating, or associating RSS feed 230 with any of the resources. Similarly, a user may also subscribe any update from any of the communities displayed in community area 216 by clicking, activating, or associating RSS feed 232 with any of the communities, selected or unselected, displayed in area 216.

According to yet another embodiment, the list of resources may be filtered based on users or authors associated with the resources. Referring to FIG. 2E, each tagged page or resource displayed in resource display area 212 has been tagged or saved by a particular user or author. For example, resource 233 listed in resource display area 212 was saved or tagged by user or author 234. User 234 may be displayed as a link or control, which when activated or selected, causes all resources tagged by or associated with the selected user as shown in FIG. 2F. In addition, those resources displayed in resource display area 212 include one or more tags displayed in tag display area 214 and are associated with one or more selected communities displayed in community area 216. Accordingly, display area 224 also updates that the currently listed resources are tagged by the selected user.

As described above, a user can subscribe an RSS feed for any of the tagged items to receive updates associated with the selected tagged items. Referring now to FIG. 2G, in this example, items displayed in resource display area 212 have been tagged with keywords listed in display area 224. When a user wishes to subscribe an RSS feed on any of the tagged items, the user may click or activate RSS feed control or link 230, which causes a menu 236 of actions to be displayed as shown in FIG. 2H. The user then may select any of the actions which may cause an RSS subscription page to be displayed as shown in FIG. 2I.

Note that, for the purposes of illustration, throughout this application, each of the above GUI pages may also be referred to as a "view." A "view" of the knowledge browser represents any or a particular state of the knowledge browser being associated with a set of selected communities, a selected tags, optionally a selected user or users (e.g., might be the current user). Each such a "view" can be associated with a URL that will recreate that view at any time (e.g., subsequently), although dynamically displaying the resources that fit that view in the underlying tag store at the time that the URL is called. The GUI as shown in FIG. 2I includes a subscription button which when activated, causes RSS feed reader (or a representation of it) to be built. In one embodiment, what is actually built is the Javascript code that generates a feed reader application into any Web page where the code is pasted. Referring now to FIG. 2J, when a user decides to subscribe an RSS feed on any of the views, an RSS feed reader is built and displayed in window 238, including the code (e.g., Java script) that implements the feed reader in window 240. The code can then be generated from each of the views that the user wishes to subscribe. Note that GUIs as shown in FIGS. 2A-2K are described for the purposes of illustration only; other configurations may exist.

Figure 3:
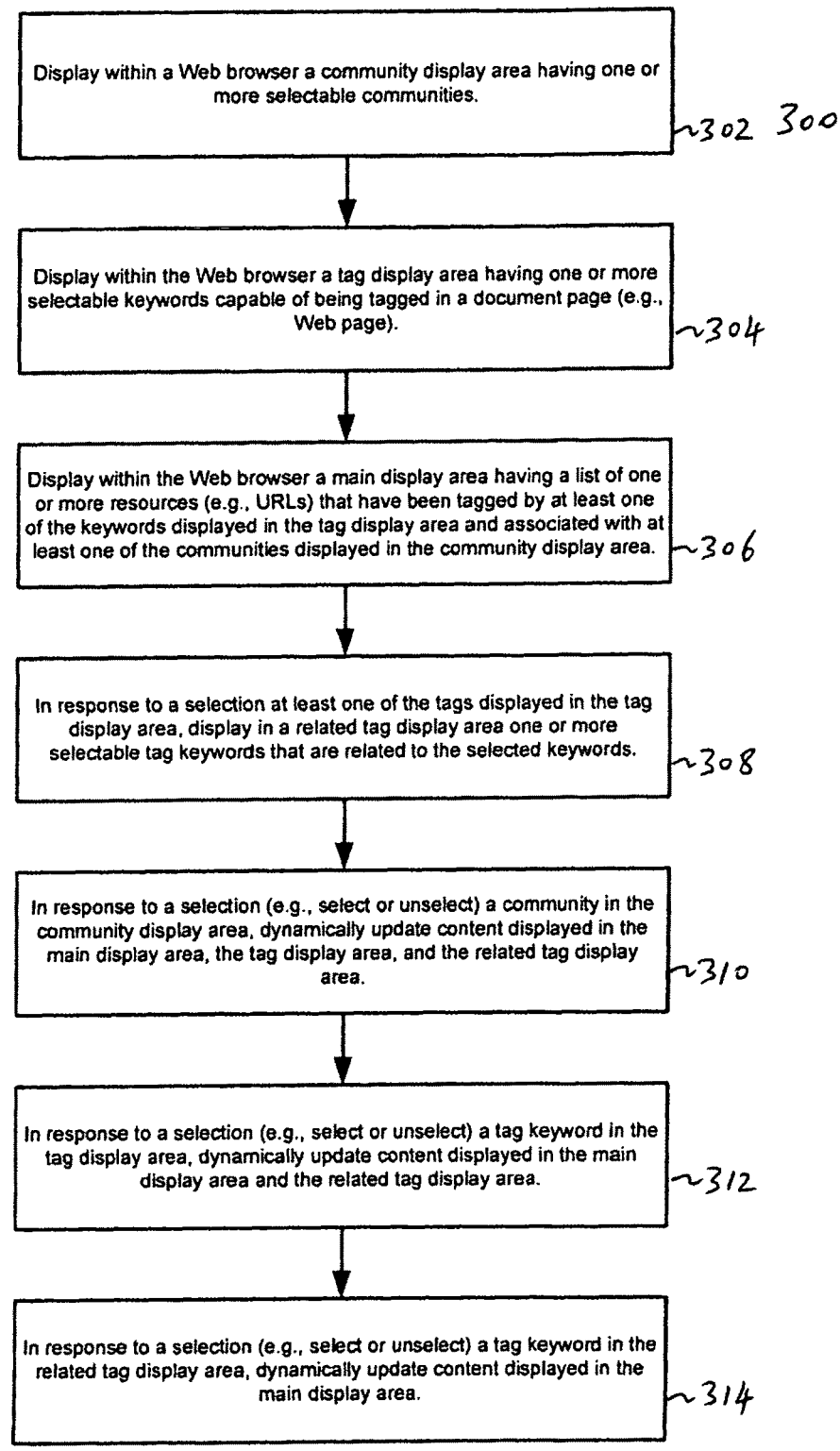
FIG. 3 is a flow diagram illustrating a process for managing tagged items according to one embodiment of the invention.

FIG. 3 is a flow diagram illustrating a process for managing tagged items according to one embodiment of the invention. Note that process 300 may be performed by processing logic which may include software, hardware, or a combination of both. For example, process 300 may be performed by systems as shown in FIGS. 1 and 2A-2K. Referring to FIG. 3, at block 302, a community area having one or more selectable communities is displayed within a Web browser. At block 304, a tag display area having one or more tag keywords is displayed within the Web browser, where the tag keywords are selectable and capable of being tagged in a document page (e.g., Web page). At block 306, processing logic displays within the Web browser a main display area having a list of one or more resources or tagged items (e.g., represented via URLs) that have been tagged by at least one of the keywords displayed in the tag display area and associated with at least one of the communities displayed in the community area. At block 308, in response to a selection of at least one of the tags displayed in the tag display area, a related tag display area is displayed having one or more tags that are related to the selected tags.

At block 310, in response to a selection of a community in the community display area, processing logic dynamically updates content displayed in the main display area, the tag display area, and/or the related tag display area. Only the content is associated with the selected one or more communities will be displayed in these areas. At block 312, in response to a selection of a tag keyword in the tag display area, processing logic dynamically updates content displayed in the main display area and the related tag display area. Only the content having at least one selected tag is displayed in the main display area and only the content related to the at least one selected tag will be displayed in the related tag area. In one embodiment, when no tags are selected, the resource list shows just all pages that are tagged "as anything" in the selected communities and/or by the selected user. This is useful, especially together with the secondary features of the knowledge browser: E.g., a user can subscribe to that "any tag" view in a feed reader, alerting the user whenever a tag arrives in user's community, or the user can subscribe to any tag by a certain user, making it easy to follow the flow of that user. Or a community website could include a list of resources recently tagged for that community. At block 314, in response to a selection of a tag in the related tag area, processing logic dynamically updates the content displayed in the main display area such that only the content tagged by the selected keywords in the regular tag area and the related tag area will be displayed. Other operations may also be performed.

Figure 4A:
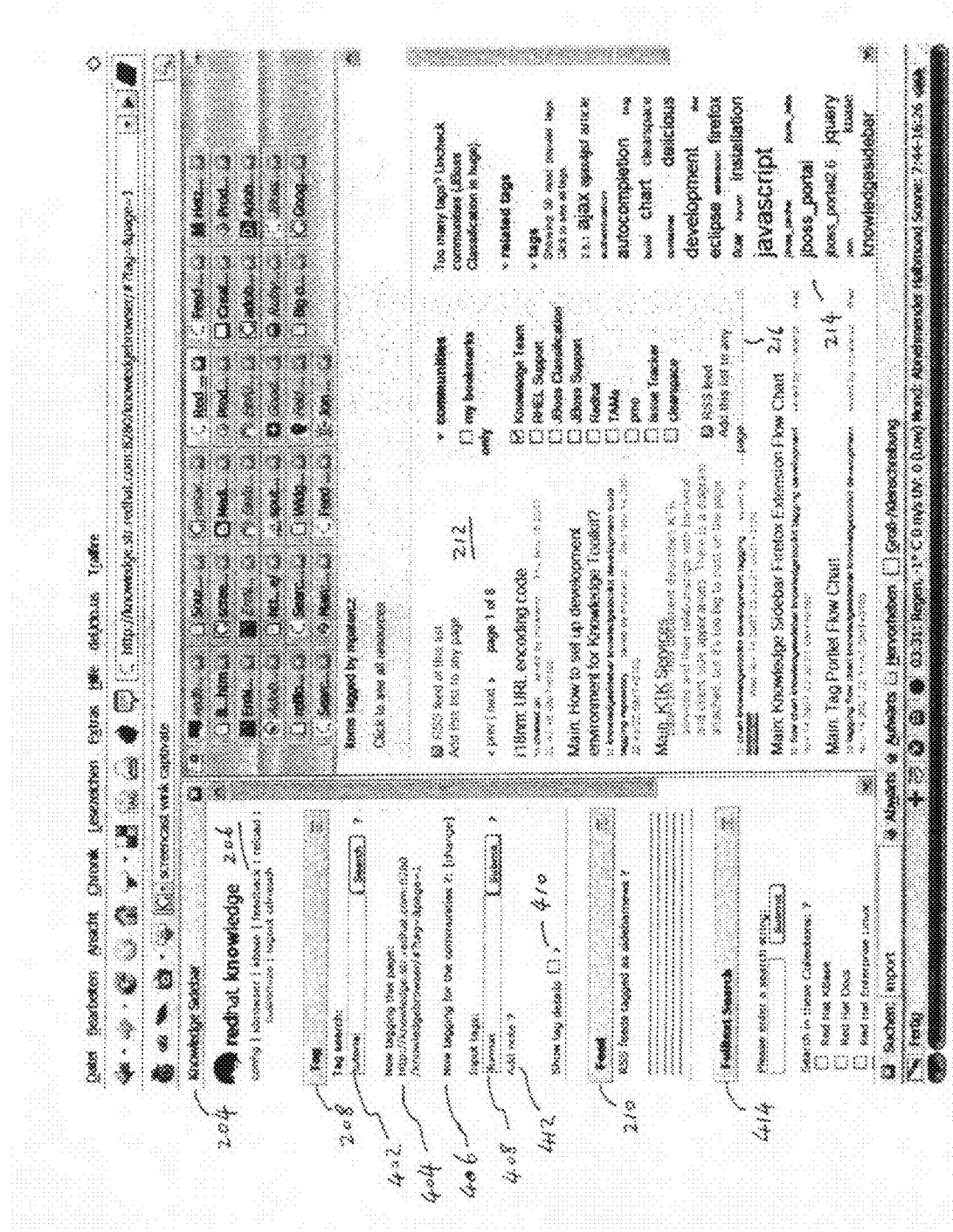
Figure 4B:
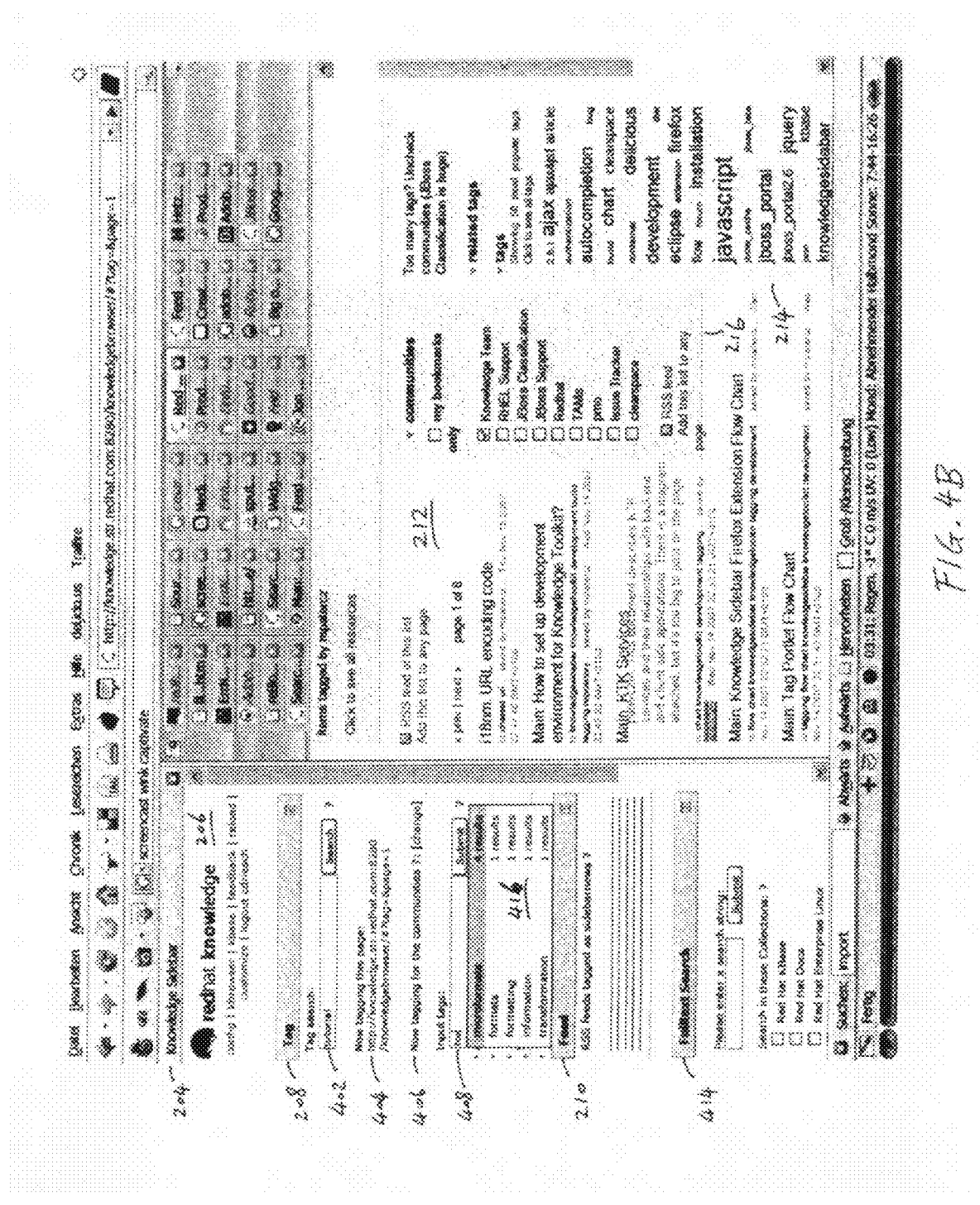
Figure 4C:
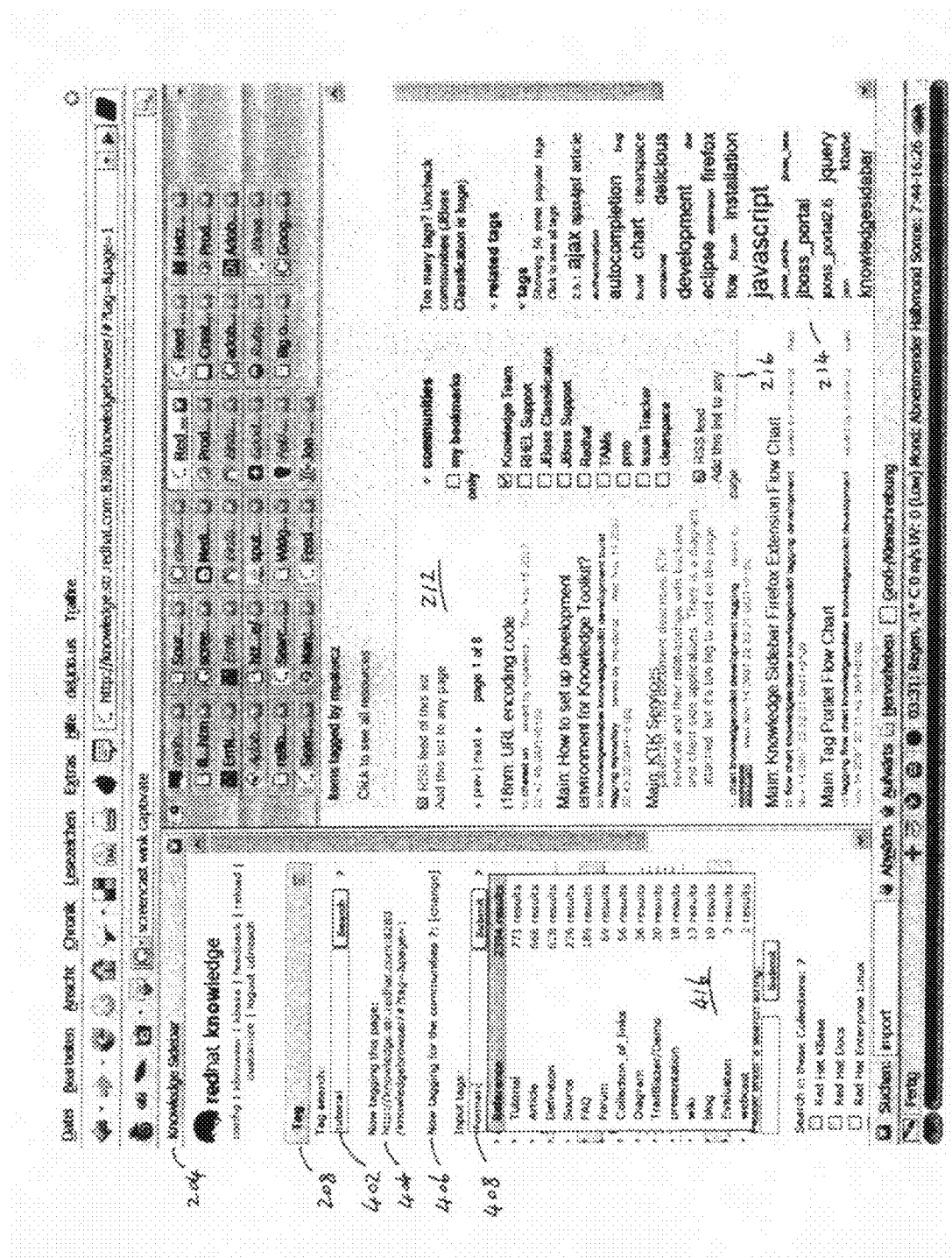

FIGS. 4A-4C are screenshots illustrating an example of GUI of a sidebar application according to one embodiment of the invention. Note that GUIs as shown in FIGS. 4A-4C may be performed by the system as shown in FIG. 1 and may be implemented in conjunction with GUIs as shown in FIGS. 2A-2K. For the purpose of consistency, certain reference numbers are maintained the same with respect to FIGS. 2A-2K. Referring to FIG. 4A, as described above, a Web browser includes a plug-in application as shown as a sidebar window 204 which is communicatively coupled to the main window of the browser having, for example, resource display area 212, tag display area 214, and community display area 216 as described above. Sidebar window 204 may be displayed in response to an activation of a button or a selection from a menu. As described above, sidebar window 204 includes a shortcut area 206 having one or more shortcut or links which when activated may display a further page such as tag browser pages as shown in FIGS. 2A-2K. In addition, sidebar window 204 includes a tag portlet 208 and a feed portlet 210.

According to one embodiment, tag portlet 208 is configured to allow a user to add and maintain metadata on Web pages or other document pages. Tagging means assigning tags (e.g., keywords or terms) to some pieces of information. Tagging Web pages can be compared to using bookmarks in a browser. The difference is tags having no tree structure and thus, a user never wonder how to organize them. Making tags public allows other users to search them. Community tagging means sharing tags among a specific group of users.

Referring back to FIG. 4A, tags can be searched via a search field 402. When a user enters a keyword for searching in the search field 402, an auto-completion feature may be used to provide suggestions to the user to choose the right or existing tags. The URL of a specific page currently displayed in the main window is shown in URL area 404 of sidebar window 204. This is useful because the Web page having a URL is stored persistently in a tag store to allow other users to subsequently search and retrieve from the tag store. Further, a user can tag a specific page to a specific community via interface 406. This would publish the tagged item or page among members of one or more communities assigned.

According to one embodiment, a user can also add a new tag via tag input field 408. Typically, a user may open the sidebar 204 and browse to a page that the user would like to tag. The user must always tag in at least one community by checking at least one community and enter the tag or tags in the tag input field 408. The user may also enter certain notes associated with the new tag via an add note interface 412. The detail of the newly entered tags may be shown via link 410, including date, authors, and communities of given tags assigned to the page shown in the main window. The details can also be edited (e.g., removed from certain communities). Each of the new tags may be removed or deleted, for example, by clicking a delete or remove button associated with the tag. Similarly, a selected community may also be removed or unselected in a similar way; however, a tag must be associated with at least one community. A list of communities associated with a user may be configured via a configuration page of the sidebar 204, such as, for example, via a "config" shortcut in the shortcut area 206, which will be described in details further below.

According to one embodiment, by tagging RSS feeds with sidebar news tag, a user makes them appear in the feed portlet 210, visible for every user who has registered in the associated community sidebar news tag. According to another embodiment, sidebar 204 further provides full-text search features in a full-text search portlet 414. A user can define a searching scope by checking the collections and the choice depends on the communities the user registered in.

In one embodiment, when a user enters a keyword or new tag in the tag input field 408, a list of suggested similar keywords or terms, and/or existing tags may be displayed as shown in FIG. 4B. Referring to FIG. 4B, when the user enters the first one or more characters in the tag input filed 408, a list of suggested similar keywords or terms, and/or existing tags is displayed in a pull-down menu or window 416 from which the user can select one of terms from the menu 416 as part of auto-completion. In one embodiment, a number of pages that have been tagged with each suggested tag or term may also be displayed.

Alternatively, as shown in FIG. 4C, the user may enter a keyword with a "type:tag" format. As a result, the auto-completion feature may only display the terms or tags associated with the specified type. In one embodiment, a number of pages that have been tagged with each suggested tag or term may also be displayed. Note that the tag store (e.g., tag store 106 of FIG. 1) may be implemented as a triple store. Thus, every tag can have a tag type. An advanced user can enter tags in the form of "tagtype:tag" such as "format:tutorial". This makes it easy to export the tag space into RDF formats for further processing, data mining, or extension of functionality.

RDF (resource description framework) is a family of Word Wide Web Consortium (W3C) specifications originally designed as a metadata model but which has come to used as a general method of modeling information through a variety of syntax formats. The RDF metadata model is based on the idea of making statements about resources in the form of subject-predicate-object expressions, called "triples" in RDF terminology. The subject denotes the resource, and the predicate denotes trials or aspects of the resource and expresses a relationship between the subject and the object. For example, one way to represent the notion "The sky has the color blue" in RDF is as a triple of specially formatted strings: a subject denoting "the sky," a predicate denoting "has the color," and an object denoting "blue." This mechanism for describing resources is a major component in what is proposed by the W3C's Semantic Web activity: an evolutionary stage of the World Wide Web in which automated software can store, exchange, and use machine-readable information distributed throughout the Web, in turn enabling users to deal with the information with greater efficiency and certainty. RDF's simple data model and ability to model disparate, abstract concepts has also led to its increasing use in knowledge management applications unrelated to Semantic Web activity.

A collection of RDF statements intrinsically represents a labeled, directed pseudo-graph. As such, an RDF-based data model is more naturally suited to certain kinds of knowledge representation than the relational model and other ontological models traditionally used in computing. However, in practice, RDF data is often stored in relational database representations, also referred to as "triple stores." The subject of an RDF statement is a resource, which may be as named by a URI (uniform resource identifier). Some resources are unnamed and are called blank nodes or anonymous resources. They are not directly identifiable. The predicate is a resource as well, representing a relationship. The object is a resource or a Unicode string literal.

In semantic Web applications and in relatively popular applications of RDF such as RSS and FOAF (friend of a friend), resources tend to be represented by URIs that intentionally denote actual, accessible data on the World Wide Web. But RDF, in general, is not limited to the description of Internet-based resources. In fact, the URI that names a resource does not have to be referenceable at all. For example, a URI that begins with "http:" and is used as a subject of an RDF statement does not necessarily have to represent a resource that is accessible via HTTP, nor does it need to represent a tangible, network-accessible resource.

Figure 5:
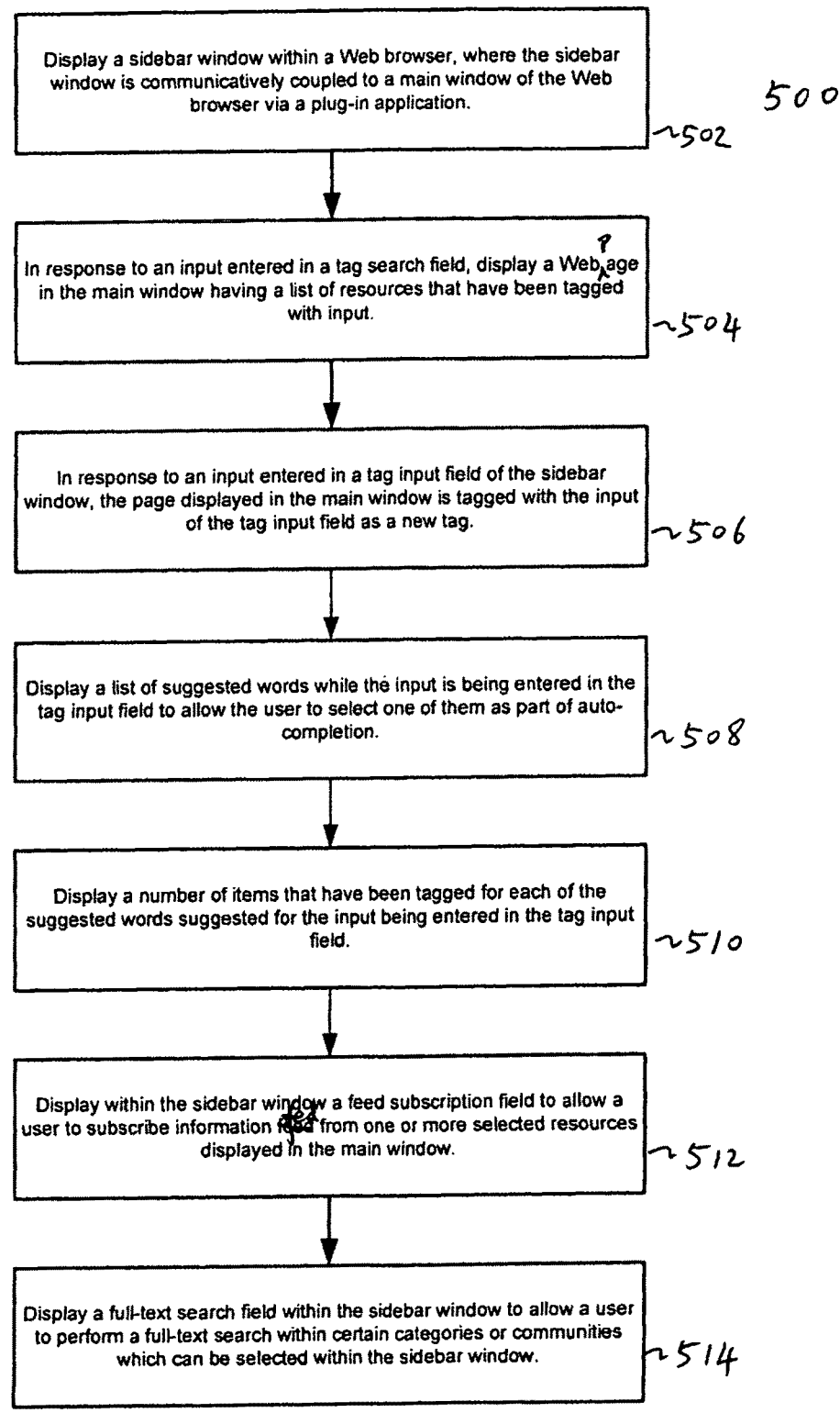
FIG. 5 is a flow diagram illustrating a process performed via a sidebar application according to one embodiment.

FIG. 5 is a flow diagram illustrating a process performed via a sidebar application according to one embodiment. Note that process 500 may be performed by processing logic which may include software, hardware, or a combination of both. For example, process 500 may be performed by the system as shown in FIGS. 1 and 4A-4C. Referring to FIG. 5, at block 502, processing logic displays a sidebar window within a browser, where the sidebar window is communicatively coupled to a main window of the browser via a plug-in interface. At block 504, in response to an input entered in a tag search field, processing logic displays a Web page in the main window having a list of resources that have been tagged with the input. At block 506, in response to an input entered in a tag input field of the sidebar window, the page displayed in the main window is tagged with the input of the tag input field as a new tag. At block 508, processing logic displays a list of suggested words while the input is being entered in the tag input field to allow a user to select one of the suggested terms or tags as part of auto-completion. At block 510, processing logic displays a number of items that have been tagged for each of the suggested terms suggested for the input being entered in the tag input field. At block 512, processing logic displays within the sidebar window a feed subscription field to allow a user to subscribe information fed from one or more selected resources displayed in the main window. At block 514, the processing logic displays a full-text search field within the sidebar window to allow a user to perform a full-text search within certain categories or communities which can be selected within the sidebar window. Other operations may also be performed.

Figure 6A:
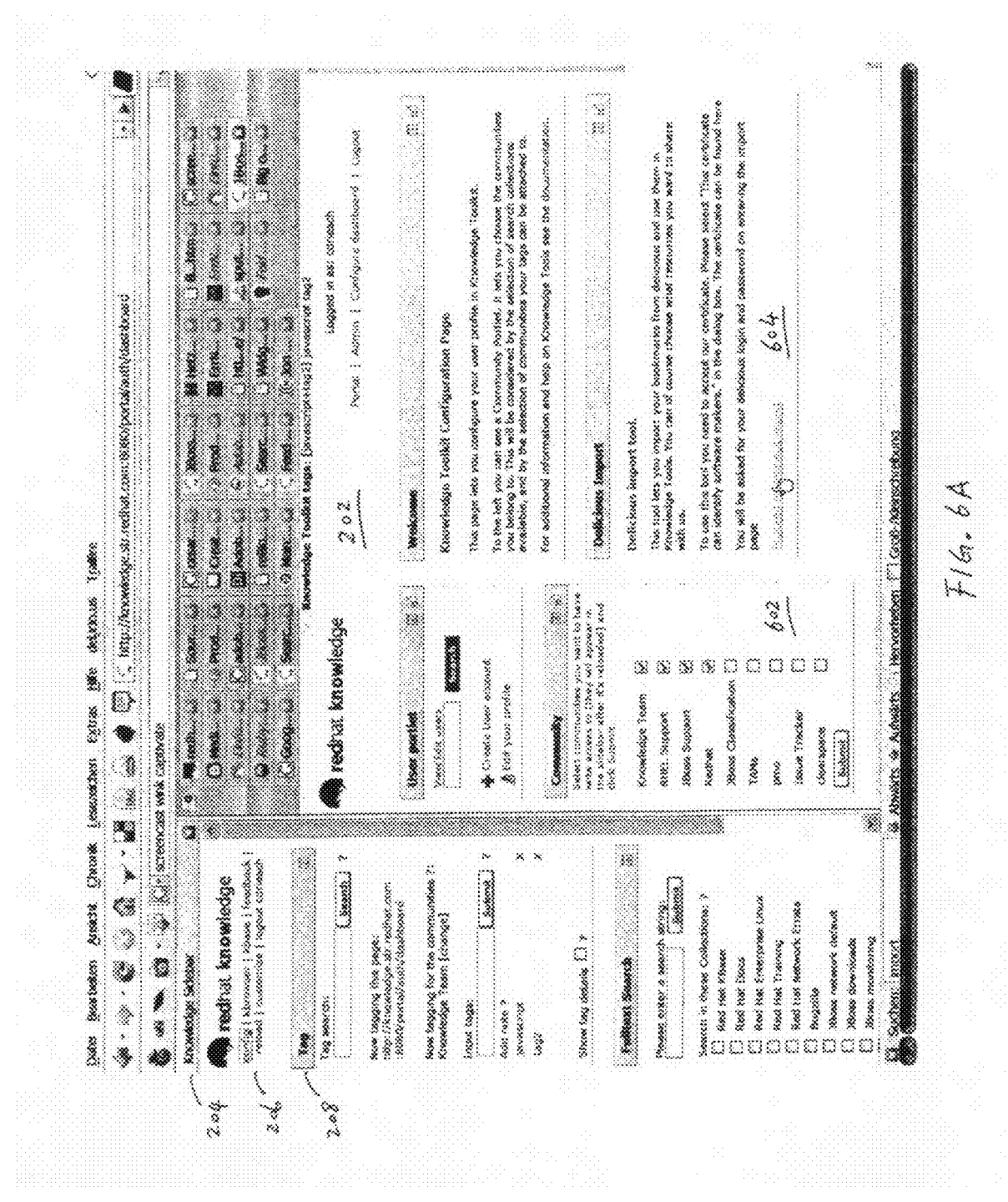
Figure 6B:
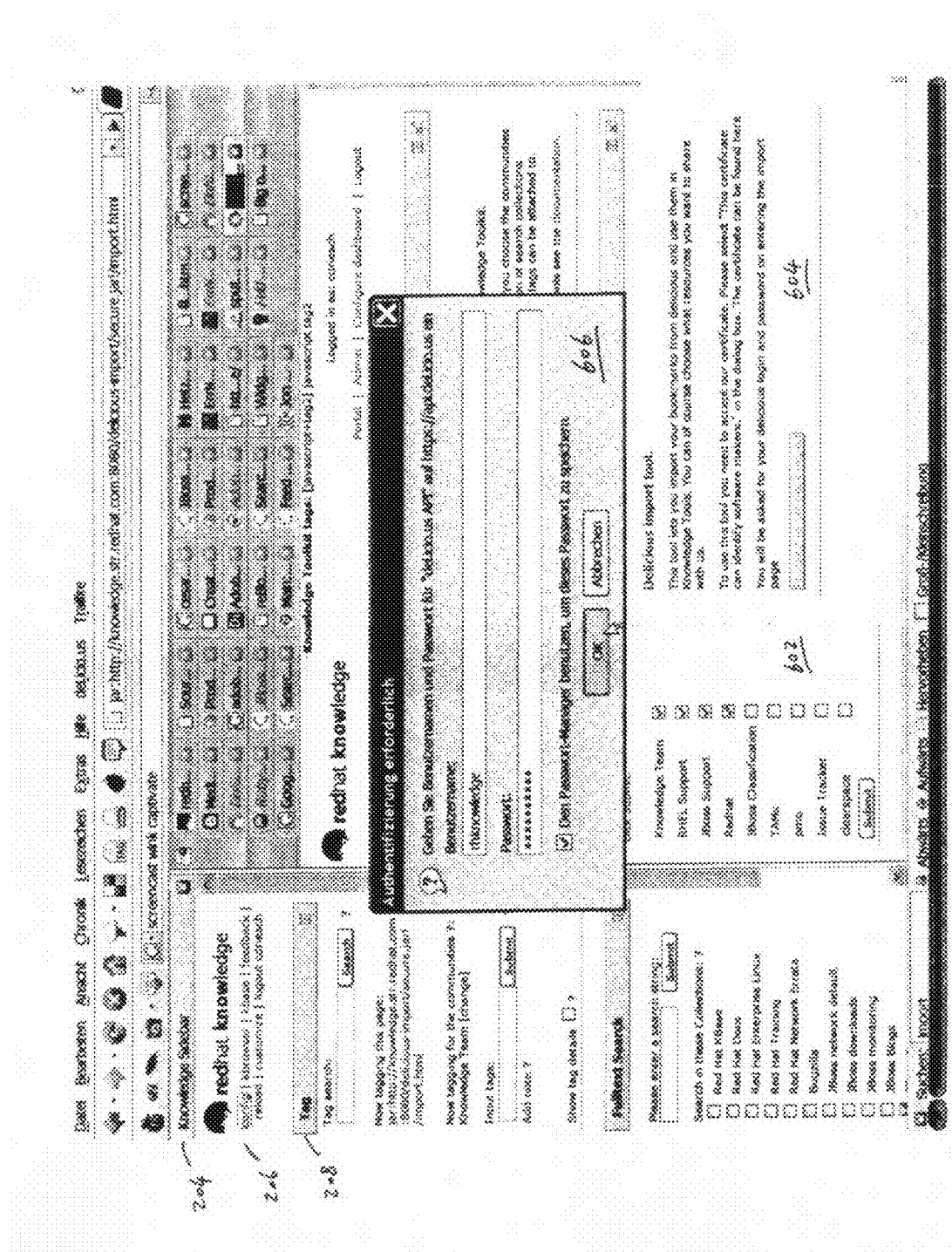
Figure 6C:
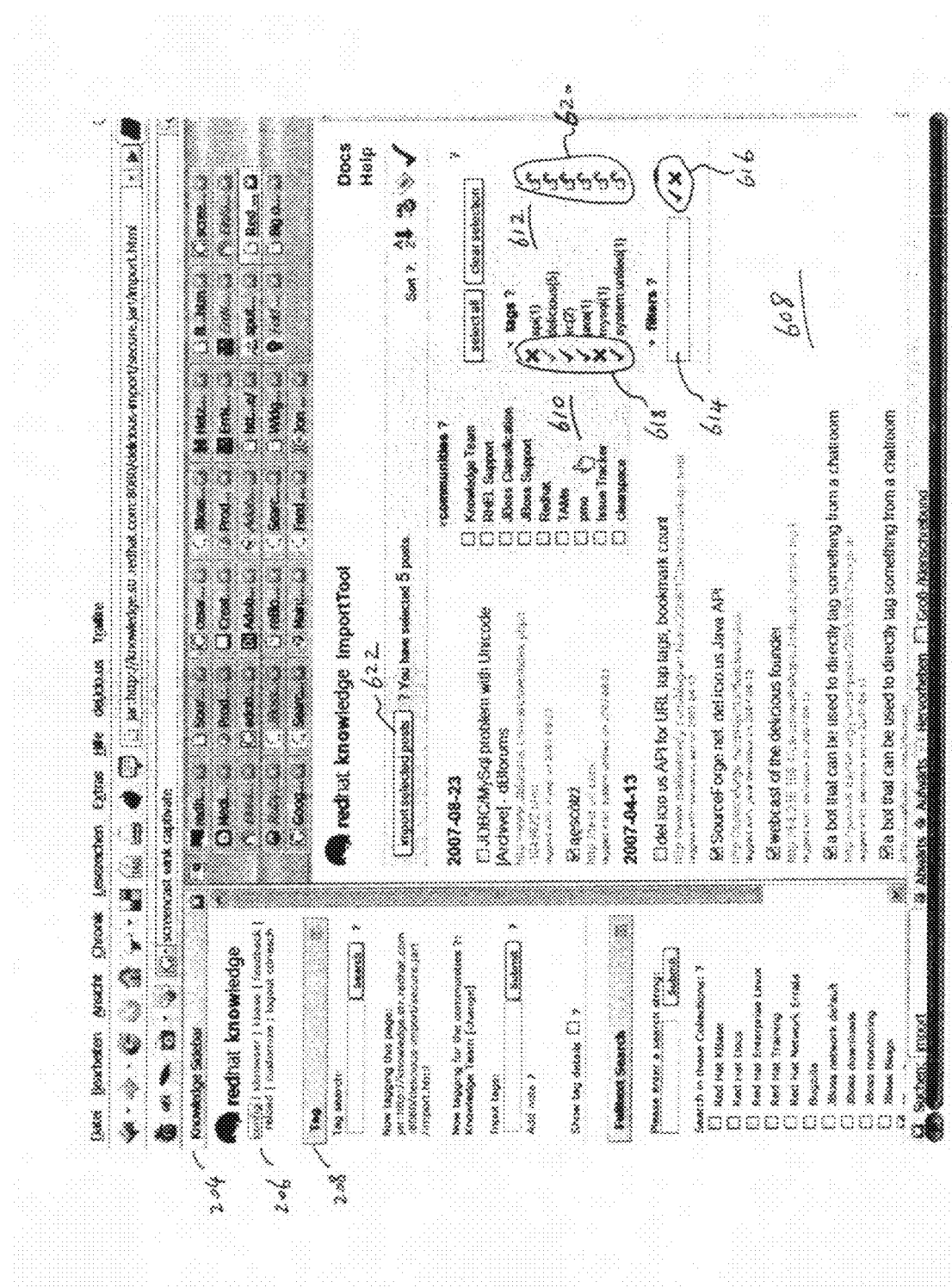

FIGS. 6A-6C are screenshots illustrating an example of GUIs of configuring a sidebar framework according to one embodiment of the invention. Referring to FIG. 6A, when a user clicks a shortcut "config" of shortcut menu 206, a configuration page is displayed in the main window 202. The configuration page includes certain areas or fields to allow the user to configure how the sidebar framework operates. For example, a user can select or unselect any of the communities displayed in area 602. When the user clicks the submit button the selected communities may show up in the sidebar window 204.

In addition, the user can import certain tags from an external environment or framework. For example, a user can activate a link 604 which may prompt the user, via the dialog box 606, to login in the environment from which the tags to be imported from, as shown in FIG. 6B. Once the user logs in, as shown in FIG. 6C, an import page is displayed in the main window. Referring to FIG. 6C, the import page includes list of resources or posts displayed in area 608. Each of the posts displayed can be select or unselected by clicking the corresponding checkbox. Similar to the tag browser application, each of the posts is displayed dependent upon the selection in the community box 610 the tag selection in the tag box 612.

For example, each of the tags displayed in area 612 can be selected or unselected by clicking the corresponding check sign 618. Similar to the tag browser application described above, the posts 608 change as the user clicks. In addition, color in conjunction with the sign can be used to indicate the specific status of the tag. For example, a red cross means no posts with this tag are selected; pale green means some of the bookmarks are selected; and green check means all of them are selected. If a user specifically wants to exclude or include certain tags, the user can lock the selection or unselection of a tag by clicking the corresponding lock icon 620.

Further, one or more filters may be specified in a filter field 614 and icons 614 may be used to add or remove a filter. A user can enter in any string and all bookmarks with addresses matching it will be selected or unselected. Later on the user can delete a filter by clicking a bin icon, or toggle its selection state. A user can have any number of filters active. The user can also select certain communities the posts should be saved to. Finally, the user can share the selected bookmarks with others in the selected communities by clicking button 622. Other configurations may exist.

Figure 7:
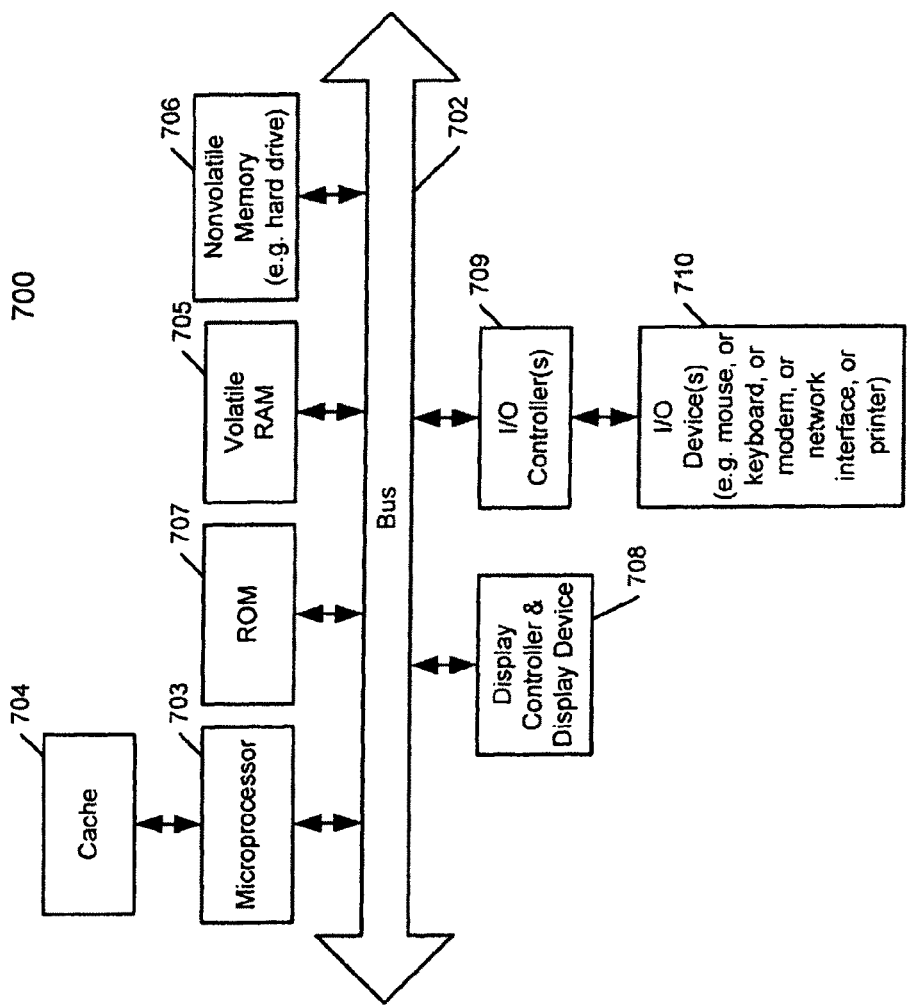
FIG. 7 is a block diagram illustrating a data processing system which may be used with an embodiment of the invention.

FIG. 7 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any-machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. For example, the system 700 may be used as part of system, either a client or a server, as shown in FIG. 1.

As shown in FIG. 7, the system 700, which is a form of a data processing system, includes a bus or interconnect 702 which is coupled to one or more microprocessors 703 and a ROM 707, a volatile RAM 705, and a non-volatile memory 706. The microprocessor 703 is coupled to cache memory 704 as shown in the example of FIG. 7. Processor 703 may be, for example, a PowerPC microprocessor or an Intel compatible processor. Alternatively, processor 703 may be a digital signal processor or processing unit of any type of architecture, such as an ASIC (Application-Specific Integrated Circuit), a CISC (Complex Instruction Set Computing), RISC (Reduced Instruction Set Computing), VLIW (Very Long Instruction Word), or hybrid architecture, although any appropriate processor may be used.

The bus 702 interconnects these various components together and also interconnects these components 703, 707, 705, and 706 to a display controller and display device 708, as well as to input/output (I/O) devices 710, which may be mice, keyboards, modems, network interfaces, printers, and other devices which are well-known in the art.

Typically, the input/output devices 710 are coupled to the system through input/output controllers 709. The volatile RAM 705 is typically implemented as dynamic RAM (DRAM) which requires power continuously in order to refresh or maintain the data in the memory. The non-volatile memory 706 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 7 shows that the non-volatile memory is a local device coupled directly to the rest of the components in the data processing system, embodiments of the present invention may utilize a non-volatile memory which is remote from the system; such as, a network storage device which is coupled to the data processing system through a network interface such as a modem or Ethernet interface. The bus 702 may include one or more buses connected to each other through various bridges, controllers, and/or adapters, as is well-known in the art. In one embodiment, the I/O controller 709 includes a USB (Universal Serial Bus) adapter for controlling USB peripherals. Alternatively, I/O controller 709 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
   storing, in a storage device, a plurality of tags used to tag a plurality of document pages, wherein each document page is identified via a corresponding unique page universal resource locator (URL);
   in response to browsing a particular document page of the plurality of document pages in a main window of a browser, displaying the corresponding page URL of the particular document page in a sidebar window communicatively coupled to the main window;
   displaying a tag input field in the sidebar window to receive a tag to be associated with the displayed page URL and to describe a contents of the particular document page; and
   in response to a subsequent selection of the tag associated with the page URL of the particular document page, displaying, by a processing unit, a list of document pages, including the particular document page, the contents of which are described by the selected tag in the main window of the browser, the list of document pages to form a view of the browser, wherein a unique view URL represents the view of the browser in a particular state, the state defined by a set of selected tags, communities and users, wherein when a user subscribes to the view using a syndicated subscription service, the user to receive notifications of document pages being newly associated with the selected tag and added to the view.

2. The method of claim 1, further comprising, in response to content entered in the tag input field, displaying a list of existing tags as suggestions to allow a user to select from the list of existing tags as part of auto-completion.

3. The method of claim 2, further comprising, for each of the existing tags, displaying a number of document pages that have been tagged by each existing tag.

4. The method of claim 3, further comprising:
   in response to selecting a tag from the list of existing tags, displaying in a first display area of the main window a list of resources that have been tagged by the selected tag; and
   displaying in a second display area of the main window a list of one or more communities in which the selected tag has been published, wherein each of the one or more communities can be selectable or unselectable.

5. The method of claim 4, further comprising, in response to selecting or unselecting a community from the second display area, dynamically updating resources displayed in the first display area, such that only resources associated with remaining selected communities are displayed in the first display area.

6. The method of claim 4, further comprising displaying in a third display area of the main window a list of tags that are associated with at least one community displayed in the second display area.

7. The method of claim 6, further comprising, in response to selecting or unselecting a tag displayed in the third display area, dynamically updating resources displayed in the first display area, such that only resources tagged by the tag selected from the third display area are displayed in the first display area.

8. The method of claim 6, further comprising displaying in a fourth display area of the main window one or more related tags that are related to at least one tag displayed in the third display area.

9. The method of claim 8, further comprising, in response to selecting or unselecting a related tag displayed in the fourth display area, dynamically updating resources displayed in the first display area, such that only resources that are tagged by the selected tags and the related tags are displayed in the first display area.

10. A non-transitory computer readable storage medium including instructions that, when executed by a processing unit, cause the processing unit to perform operations comprising:
    storing, in a storage device, a plurality of tags used to tag a plurality of document pages, wherein each document page is identified via a corresponding unique page universal resource locator (URL);
    in response to browsing a particular document page of the plurality of document pages in a main window of a browser, displaying the corresponding page URL of the particular document page in a sidebar window communicatively coupled to the main window;
    displaying a tag input field in the sidebar window to receive a tag to be associated with the displayed page URL and to describe a contents of the particular document page; and
    in response to a subsequent selection of the tag associated with the page URL of the particular document page, displaying, by the processing unit, a list of document pages, including the particular document page, the contents of which are described by the selected tag in the main window of the browser, the list of document pages to form a view of the browser, wherein a unique view URL represents the view of the browser in a particular state, the state defined by a set of selected tags, communities and users, wherein when a user subscribes to the view using a syndicated subscription service, the user to receive notifications of document pages being newly associated with the selected tag and added to the view.

11. The non-transitory computer readable storage medium of claim 10, wherein the operations further comprise, in response to content entered in the tag input field, displaying a list of existing tags as suggestions to allow a user to select from the list of existing tags as part of auto-completion.

12. The non-transitory computer readable storage medium of claim 11, wherein the operations further comprise, for each of the existing tags, displaying a number of document pages that have been tagged by each existing tag.

13. The non-transitory computer readable storage medium of claim 12, wherein the operations further comprise:
    in response to selecting a tag from the list of existing tags, displaying in a first display area of the main window a list of resources that have been tagged by the selected tag; and
    displaying in a second display area of the main window a list of one or more communities in which the selected tag has been published, wherein each of the one or more communities can be selectable or unselectable.

14. The non-transitory computer readable storage medium of claim 13, wherein the operations further comprise in response to selecting or unselecting a community from the second display area, dynamically updating resources displayed in the first display area, such that only resources associated with remaining selected communities are displayed in the first display area.

15. The non-transitory computer readable storage medium of claim 13, wherein the operations further comprise displaying in a third display area of the main window a list of tags that are associated with at least one community displayed in the second display area.

16. The non-transitory computer readable storage medium of claim 15, wherein the operations further comprise, in response to selecting or unselecting a tag displayed in the third display area, dynamically updating resources displayed in the first display area, such that only resources tagged by the tag selected from the third display area are displayed in the first display area.

17. The non-transitory computer readable storage medium of claim 15, wherein the operations further comprise displaying in a fourth display area of the main window one or more related tags that are related to at least one tag displayed in the third display area.

18. The non-transitory computer readable storage medium of claim 17, wherein the operations further comprise, in response to selecting or unselecting a related tag displayed in the fourth display area, dynamically updating resources displayed in the first display area, such that only resources that are tagged by the selected tags and the related tags are displayed in the first display area.

19. A data processing system, comprising:
   a processing unit; and
   a memory to store instructions, which when executed from the memory, cause the processor processing unit to:
      store, in a storage device, a plurality of tags used to tag a plurality of document pages, wherein each document page is identified via a corresponding unique page universal resource locator (URL),
      in response to browsing a particular document page of the plurality of document pages in a main window of a browser, display the corresponding page URL of the particular document page in a sidebar window communicatively coupled to the main window,
      display a tag input field in the sidebar window to receive a tag to be associated with the displayed page URL and to describe a contents of the particular document page, and
      in response to a subsequent selection of the tag associated with the page URL of the particular document page, display a list of document pages, including the particular document page, the contents of which are described by the selected tag in the main window of the browser, the list of document pages to form a view of the browser, wherein a unique view URL represents the view of the browser in a particular state, the state defined by a set of selected tags, communities and users, wherein when a user subscribes to the view using a syndicated subscription service, the user to receive notifications of document pages being newly associated with the selected tag and added to the view.

* * * * *